US008175289B2

(12) United States Patent
Gordon et al.

(10) Patent No.: US 8,175,289 B2

(45) Date of Patent: May 8, 2012

(54) DIGITAL AUDIO DISTRIBUTION NETWORK

(76) Inventors: Raymond L. Gordon, San Diego, CA (US); Kent L. Deines, Poway, CA (US)

( * ) Notice: Subject to any disclaimer, the term of this patent is extended or adjusted under 35 U.S.C. 154(b) by 520 days.

(21) Appl. No.: 12/400,550

(22) Filed: Mar. 9, 2009

(65) Prior Publication Data

US 2009/0232326 A1 Sep. 17, 2009

Related U.S. Application Data

(60) Provisional application No. 61/036,307, filed on Mar. 13, 2008, provisional application No. 61/060,882, filed on Jun. 12, 2008.

(51) Int. Cl.
*H04B 3/00* (2006.01)

(52) U.S. Cl. ................. 381/81; 381/77; 381/85; 700/94

(58) Field of Classification Search .................... 381/77, 381/81, 85; 700/94
See application file for complete search history.

(56) References Cited

U.S. PATENT DOCUMENTS

| | | | | |
|---|---|---|---|---|
| 5,577,042 | A * | 11/1996 | McGraw et al. | 370/257 |
| 6,959,220 | B1 * | 10/2005 | Wiser et al. | 700/94 |
| 7,072,726 | B2 * | 7/2006 | Wilson et al. | 700/94 |
| 2003/0052815 | A1 * | 3/2003 | Russell et al. | 342/357.1 |
| 2005/0131558 | A1 * | 6/2005 | Braithwaite et al. | 700/94 |
| 2009/0193472 | A1 * | 7/2009 | Braithwaite et al. | 725/74 |

* cited by examiner

*Primary Examiner* — Thinh T Nguyen

(57) ABSTRACT

A digital audio distribution network includes a plurality of nodes and at least one transmission line that interconnects the nodes to form the digital audio distribution network. A first node in the plurality of nodes receives a user command, encodes the user command, and sends the encoded user command and digital audio over the transmission line. A second node in the plurality of nodes receives the encoded user command and the digital audio over the transmission line.

28 Claims, 17 Drawing Sheets

DIGITAL AUDIO DISTRIBUTION NETWORK

CROSS-REFERENCE TO RELATED APPLICATIONS

This application claims the benefit of U.S. Provisional Application titled "DIGITAL AUDIO DISTRIBUTION OVER A SINGLE TWISTED PAIR", Ser. No. 61/036,307, filed Mar. 13, 2008, and U.S. Provisional Application titled "DIGITAL AUDIO DISTRIBUTION OVER A SINGLE TWISTED PAIR", Ser. No. 61/060,882, filed Jun. 12, 2008, both incorporated herein by reference.

BACKGROUND OF THE INVENTION

1. Field of the Invention

The present invention generally relates to devices for distributing an audio signal over a network. More specifically, but without limitation thereto, the present invention is directed to a method and apparatus for distribution of an audio signal over a network of twisted pair cables.

2. Description of Related Art

There is a large and growing interest in the distribution of audio signals for entertainment and business in homes and in commercial buildings. Existing audio distribution networks typically require expensive components and cables, and the networks are complex to operate.

SUMMARY OF THE INVENTION

In one embodiment, a digital audio distribution network includes a plurality of nodes and at least one transmission line that interconnects the nodes to form the digital audio distribution network. A first node in the plurality of nodes receives a user command, encodes the user command, and sends the encoded user command and digital audio data over the transmission line. A second node in the plurality of nodes receives the encoded user command and the digital audio data over the transmission line. The user command indicates a function to be performed by the network including but not limited to setting an audio volume level or changing the routing of the network.

In another embodiment, a digital audio distribution network includes a plurality of nodes and at least one transmission line that interconnects the nodes to form the digital audio distribution network. A self-routing hub in the plurality of nodes detects from each of a plurality of audio signal sources when an audio signal is being transmitted from one of the audio signal sources to the self-routing hub and transmits the audio signal from the self-routing hub over the transmission line to at least one other node in the plurality of nodes.

In a further embodiment, a digital audio distribution network includes a plurality of nodes. At least one transmission line interconnects the nodes for carrying digital audio data between the nodes by only a single unshielded twisted pair in the transmission line.

In yet another embodiment, a digital audio distribution network includes a plurality of nodes located inside walls of a structure, at least one of the nodes comprising terminals for connecting to mains power wiring inside the walls.

BRIEF DESCRIPTION OF THE DRAWINGS

The above and other aspects, features and advantages will become more apparent from the description in conjunction with the following drawings presented by way of example and not limitation, wherein like references indicate similar elements throughout the several views of the drawings, and wherein.

Figure 1:
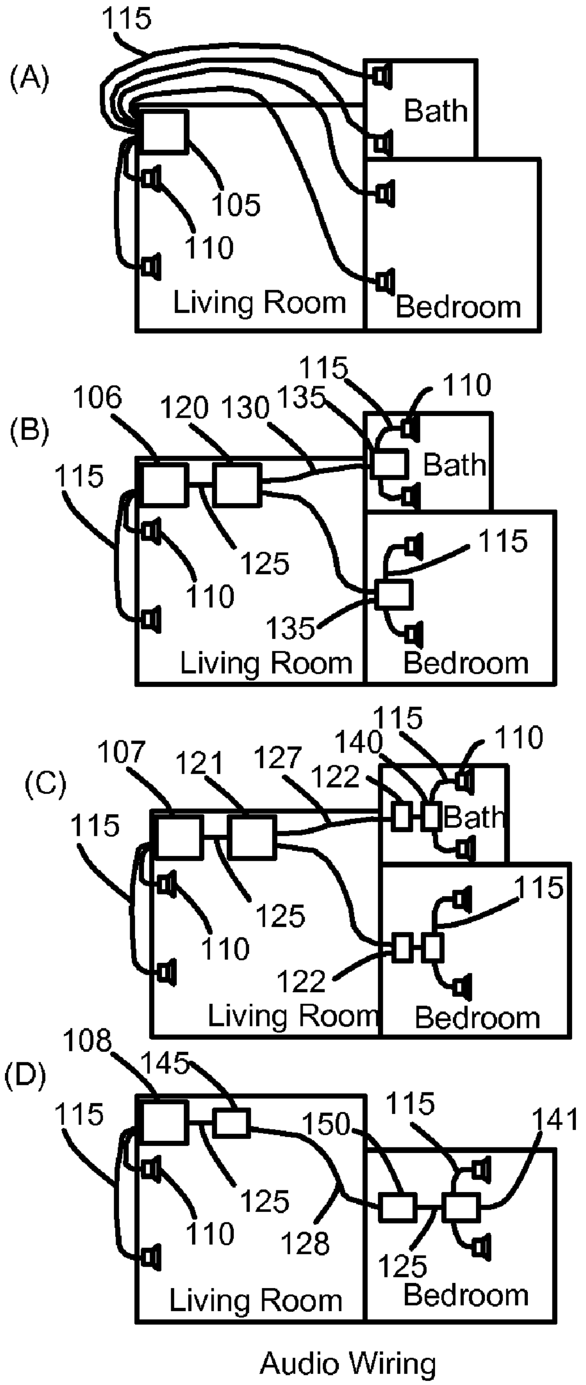
FIG. 1 (PRIOR ART)
FIG. 1A illustrates an analog audio distribution network having a star topology with a central source connected by analog audio signal cables to remote loudspeakers according to the prior art.
FIG. 1B illustrates an audio distribution network connected by multiple twisted pairs according to the prior art.
FIG. 1C illustrates a digital audio distribution network using remote stations and analog signal amplifiers according to the prior art.
FIG. 1D illustrates an audio distribution network using baluns according to the prior art.
FIG. 1E illustrates the AC power connections for the audio distribution network of FIG. 1A according to the prior art.
FIG. 1F illustrates the AC power connections for the audio distribution network of FIG. 1B according to the prior art.
FIG. 1G illustrates the AC power connections for the audio distribution network of FIG. 1C according to the prior art.
FIG. 1H illustrates the AC power connections for the audio distribution network of FIG. 1D according to the prior art.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that may be useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order to be performed. However, practitioners of the art will understand that the specific order is only given by way of example and that the specific order does not exclude performing the described steps in another order to achieve substantially the same result. Also, the terms and expressions used in the description have the ordinary meanings accorded to such terms and expressions in the corresponding respective areas of inquiry and study except where other meanings have been specifically set forth herein.

Many homeowners and business operators have similar needs for simple audio distribution networks. They want to distribute the same audio to multiple sites around their structures, they want high quality audio reproduction, they want the network to be simple and inexpensive to install, and they want the capability to adjust the loudspeaker volume in each listening area.

Most homes and commercial buildings use structural wiring, that is, an infrastructure of low voltage and high voltage cables routed inside the walls. High voltage cables supply mains power, e.g. 120 V AC power, throughout the structure. CAT5 cables, which are commonly used as low voltage cables, include four unshielded twisted pairs. Telephone wiring often uses cables with just two or three pairs of wires. An unshielded twisted pair is two wires, commonly 24 gauge, that have been twisted together to form a pair. Twisting the wires reduces the noise picked up by the cable. A shielded twisted pair is the same, but with a conductive shield around the pair. The shield further reduces noise. There are other variations on CAT5 such as CAT5e and CAT6, but for the purposes of this patent, CAT5 is assumed to include these and any other cable that holds four unshielded twisted pairs of wires.

For the purposes of this disclosure, a connection to AC power is generally through an AC outlet, using an AC plug or an AC adapter. On the other hand, connections to mains wiring generally use permanent or semi-permanent means including but not limited to screw terminals or wire slots. Mains wiring connections are generally made to power cables that reside inside a structure's walls.

Many structures have extra wires in the walls, left over, for example, after wiring telephone networks. For example, a structure that uses a CAT5 cable to carry three phone lines may have a single unused twisted pair. CAT5 cables that carry 100 base T networking signals may have two unused twisted pairs. Accordingly, telephone lines and network cables form a web of interconnections around a structure that includes one or more unused twisted pairs. However, a single twisted pair configured as a web having an arbitrary topology is generally inadequate and inconvenient for use in previous audio distribution networks, as most audio distribution networks require more than a single pair of wires. Audio distribution networks that can transport audio over a single pair of wires require coaxial cable, not twisted pairs. Audio distribution systems that use twisted pairs also require shields. The digital audio hubs in FIG. 1C would generally require several additional components outside the walls at each node to accommodate the distribution of digital audio over a single twisted pair.

Networks may be arranged in various network topologies, for example: tree, star, line, ring, mesh, and bus topologies. There are other variations as well as hybrid combinations of these topologies. Telephone networks in houses commonly use a tree topology, where the trunk of the tree is the entry point of the phone line into the house. Each switch in an Ethernet local area network (LAN) can be considered the center of a star, and an entire LAN can be considered a hybrid arrangement of stars. The same LAN with a router connection to the outside wide area network may have a tree topology with the trunk starting at the router.

FIG. 1A illustrates an analog audio distribution network having a star topology with a central source connected by analog audio signal cables to remote loudspeakers according to the prior art. Shown in FIG. 1A are a distribution amplifier 105, audio speakers 110, and speaker cables 115.

In FIG. 1A, the distribution amplifier 105 drives the audio speakers 110 over the speaker cables 115 with an analog audio signal. The speaker cables 115 are generally much larger and heavier than low voltage signal cables, because the speaker cables 115 typically carry audio signal power levels that can exceed one hundred watts. Accordingly, a twisted pair is inadequate to handle the power output of many analog audio distribution networks.

FIG. 1B illustrates an audio distribution network connected by multiple twisted pairs according to the prior art. Shown in FIG. 1B are an audio source 106, audio speakers 110, analog signal speaker cables 115, an A-Bus distribution module 120, an audio cable 125, A-Bus cables 130, and remote stations 135.

In FIG. 1B, the audio source 106 may be, for example, a stereo amplifier similar or identical to the distribution amplifier 105. The audio source 106 is connected to the speaker cables 115 and the audio speakers 110. The A-Bus distribution module 120, also referred to as a hub, receives analog or digital audio from an audio source over the audio cable 125 and distributes the audio signal over the A-bus cables 130 to the remote stations 135, also referred to as amplified keypads, which typically include speaker and keypad controls for volume and channel selection. The A-Bus cables 130 include four unshielded twisted pairs. A-Bus networks and other similar proprietary networks use dedicated CAT-5 cables or their electrical equivalents, each of which holds four unshielded twisted pairs. The A-bus cables 130 carry the audio signals, control and status signals, and power to the remote stations 135.

In operation, the remote stations 135 amplify the audio signal, implement user control functions such as volume control and channel selection of the audio signal, and transmit the amplified audio signal through the speaker wires 115 to the audio speakers 110.

Digital audio reproduction has existed since the advent of the compact disk, or CD, and many CD players and other devices transmit digital audio. Many amplifiers and active, that is, self-powered, speaker systems receive digital audio. The amplifiers typically convert the digital audio into analog signals to drive the audio speakers. Amplified speaker systems usually include an amplifier located inside one of several speaker enclosures and analog signal speaker wires that connect the amplifier to the audio speakers in the other speaker enclosures.

A common standard used for digital audio is IEC60598, which includes the previous SPDIF (Sony/Philips Digital Interconnect Format) and AES/EBU (Audio Engineering Society/European Broadcasting Union) standards. Digital audio has better noise immunity than analog audio, and digital audio can carry mono, stereo, and multichannel theatre sound audio signals in the same audio cable.

IEC60598 digital audio may advantageously be propagated over a single twisted pair of structural wiring. However, none of the IEC60598 formats are designed to work with the twisted pairs in structural wiring. For example, the IEC60598 Type I (SPDIF) standard requires a coaxial cable having an impedance of 75 ohms; while a twisted pair has a typical impedance of 110 ohms. The IEC60598 Type II (AES/EBU) standard requires shielded twisted pairs that have a typical impedance of 110 ohms. Further, the IEC60598 standard does not include any form of networking.

Digital audio hubs distribute audio signals through multiple coaxial cables or shielded twisted pairs, but they are generally not designed to use unshielded twisted pairs. Hubs that distribute IEC60598 Type I (SPDIF) are designed for 75-ohm coaxial cable connections. Coaxial cables are often used to distribute television signals around a structure, and the same cables may be used for digital audio. The coaxial cables are typically stiff and thick to minimize attenuation and induced noise. Consequently, they are more difficult to install than CAT5 cables. However, the 75-ohm impedance of coaxial cables is different from the 110-ohm impedance of typical twisted pairs. Because digital audio signals have frequencies in the MHz range, reflections from impedance mismatches degrade the digital audio signals, which may render the digital audio unusable at a digital audio receiver. Distribution hubs for IEC60598 Type II (AES/EBU) use all three conductors in a shielded twisted pair, which is not compatible with the unshielded twisted pair wiring in CAT5 cables.

FIG. 1C illustrates a digital audio distribution network using remote stations and analog signal amplifiers according to the prior art. Shown in FIG. 1C are a digital audio source 107, audio speakers 110, analog signal speaker cables 115, a digital audio distribution module 121, remote stations 122, audio cables 125, digital audio cables 127, and analog signal amplifiers 115.

In FIG. 1C, the digital audio distribution module 121 distributes the digital audio from the audio source 107 over the digital audio cables 127. When the digital audio is distributed using IEC60598 Type I (SPDIF), the digital audio cables 127 are coaxial cables. When the digital audio is distributed using IEC60598 Type II (AES/EBU), the digital audio cables 127 are shielded twisted pairs. The remote stations 122 receive the digital audio and convert the digital audio to an analog audio signal. The analog audio signal is connected to the inputs of the analog signal amplifiers 140. The analog signal amplifiers 140 drive the audio speakers 110 over the speaker cables 115. Alternatively, amplifiers that can decode digital audio may be used that combine the functions of the remote stations 122 and the amplifiers 140.

Low-level analog audio signals are unsuitable for audio distribution networks because 60 Hz hum and other undesirable electrical noise may be induced in the wiring and reproduced at the loudspeakers. Baluns are devices that convert single-ended analog signals (signal and common or ground) to balanced (differential) analog signals and vice versa. One balun may be used to convert a single-ended audio signal to a differential audio signal at the audio source, and another balun may be used to convert the balanced audio signal back to a single-ended audio signal at the amplifier. When the balanced signal is converted back to a single-ended signal, the electrical noise induced in the wiring over the distance between the audio source and the amplifier is canceled, while the audio signal is restored to its original state. Baluns may be included in an audio distribution network, but they are not sufficient for audio distribution by themselves. Each audio line requires a pair of baluns using this approach.

FIG. 1D illustrates an audio distribution network using baluns according to the prior art. Shown in FIG. 1D are an audio source 108, audio speakers 110, analog audio speaker cables 115, audio cables 125, a balanced transmission line 128, an amplifier 141, and baluns 145 and 150.

In FIG. 1D, the audio source 108 supplies a line level analog signal through the single-ended audio cable 125 to the balun 145. The audio cable 125 may be, for example, a coaxial cable. The balun 145 is connected to the balun 150 by the balanced transmission line 128. The balanced transmission line 128 may be, for example, a twisted pair in a CAT5 cable. The balun 150 converts the balanced analog signal to a line level analog signal connected by the audio cable 125 to the amplifier 141. The amplifier 141 reproduces the analog signal from the audio speakers 110 connected to the amplifier 141 by the speaker wires 115.

FIG. 1E illustrates the AC power connection for the audio distribution network of FIG. 1A. Shown in FIG. 1E are a distribution amplifier 105, audio speakers 110, and an AC power cable 165.

In FIG. 1E, the AC power cable 165 is an AC power cord, which plugs into a wall socket from the audio distribution amplifier. The AC power cable 165 is the only power connection required for the audio distribution network of FIG. 1A.

FIG. 1F illustrates the audio distribution network of FIG. 1B connected by AC power cables according to the prior art. Shown in FIG. 1F are an audio source 106, audio speakers 110, a distribution module 120, remote stations 135, AC power cables 165, and unshielded twisted pairs 170, which are inside cables 130 in FIG. 1B.

The audio source 106 and the distribution module 120 are powered by the AC power cables 165 plugged into to AC wall sockets. The distribution module 120 supplies power to the remote stations 135 over one of the single twisted pairs 170 inside the CAT5 cable 130 in FIG. 1B.

FIG. 1G illustrates the audio distribution network of FIG. 1C with the audio cables replaced by AC power cables connected at AC wall outlets. Shown in FIG. 1G are a digital audio source 107, audio speakers 110, a digital audio distribution module 121, remote stations 122, amplifiers 140, and AC power cables 165.

In FIG. 1G, the AC power cables 165 connect the components such as the digital audio source 107, the digital audio distribution module 121, the remote stations 122, and the amplifiers 140 that require AC power to AC wall sockets.

FIG. 1H illustrates the audio distribution network of FIG. 1D with the audio cables replaced by power cables according to the prior art. Shown in FIG. 1H are an audio source 108, audio speakers 110, baluns 145 and 150, and AC cords 165.

In FIG. 1H, each powered module obtains its power by connecting the AC cords 165 to wall sockets. Baluns do not normally require power, and they may be used with both analog signals and digital audio.

Although FIGS. 1A-1H all illustrate stereo audio distribution networks, other audio formats such as mono audio may also be configured for audio distribution networks using the same components.

Wireless systems can distribute audio, but with the disadvantages of limited range and susceptibility to electrical interference. Audio may be distributed over networks using Internet Protocol (IP), but each speaker node would require a computer or the equivalent to connect to the Internet, and each Internet node requires an IP address.

Unless otherwise indicated, the term “network” by itself means a digital audio distribution network. A digital audio distribution network includes nodes and transmission lines that connect the nodes. Each transmission line may be, for example, a single unshielded twisted pair of wires. One pair is sufficient to connect two nodes, but there are circumstances where multiple transmission lines may be used. Each transmission line transmits digital audio from one node to another node. The data transmission over each transmission line begins at a node on one end of the transmission line and ends at the node on the opposite end of the transmission line. A node is downstream from another node if the first node receives data that passes through the other node. Conversely, the data passes through an upstream node before reaching a downstream node. The network may be rerouted to change the direction of data flow, but the data flow direction remains constant as long as the network routing does not change.

Cables have intrinsic impedance, which is a physical characteristic of the cable. Unshielded twisted pairs have a typical impedance of around 110 ohms, while coaxial cables typically have an impedance of 50 or 75 ohms. Impedance mismatches at junctions create reflections in the signal, which may corrupt the digital data. Reflections may be eliminated from the network by matching the impedance at each junction in the network. A junction is a connection between a transmission line and a node. Because all of the transmission lines in a network are usually all of the same type, the transmission line impedance is also the network impedance.

Audio distribution in a structural wiring environment represents a merging of two substantially different technologies. On the one hand, audio distribution originates with the design of high quality audio reproduction equipment that has developed standard methods and infrastructure specific to audio equipment technology. Audio distribution products retain many of the characteristic features of high quality audio reproduction equipment including cables, connectors, AC power cords, and physical packaging. On the other hand, structural wiring design has developed a different set of methods to facilitate installation of reliable, permanent wiring behind walls of structures quickly, inexpensively, and safely.

While some audio distribution products such as speakers and amplified keypads are being installed inside walls, major parts of audio distribution networks are located outside walls and connect to AC power from AC wall outlets. Wall outlets are convenient for plugging and unplugging AC power; however, audio distribution networks are generally intended for permanent installation and do not need to be unplugged, except for maintenance. The following are some aspects of structural wiring that may be applied to digital audio distribution network design:

1) Ethernet cables are immune to electrical noise. Accordingly, digital data, including audio digital data, may be run for long distances around a typical structure such as commercial and residential property without interference from AC power wires, fluorescent lighting, and other electrical noise sources.
2) Ethernet wiring is routinely connected into patch panels using insulation displacement punch-down connections that are known to produce long-term reliable connection and are also capable of carrying high frequency digital signals without introducing noise or signal distortion.
3) Telephone wiring is routinely connected using similar patch panels and punch-down connections with results similar to those obtained with Ethernet.
4) Mains wiring is ubiquitous inside structural walls and may be easily and inexpensively run to any location inside the walls at the same time as other wiring is installed. While installers are generally careful about the relative placement of mains wiring and networking cables, both routinely coexist in close proximity without degrading the performance of digital data networks.
5) The installation of in-wall mains wiring is implemented with simple screw terminals and wire slot terminals, providing reliable long-term connections that may be daisy-chained behind the walls from one power outlet to the next. Because the in-wall mains wiring is inaccessible to people during their normal activities, there are fewer safety issues with in-wall wiring. Accordingly, designers of structural wiring may focus on increasing reliability and lowering costs.

One aspect of digital audio that has apparently not been exploited is selecting a portion of digital audio to be reproduced at one loudspeaker while passing on all of the digital audio that holds all the audio signal information to another loudspeaker. For example, one loudspeaker may be configured to reproduce only the left channel of a stereo audio signal, and a second loudspeaker may be configured to reproduce only the right channel of the stereo audio signal. Alternatively, one loudspeaker may be configured monophonically to reproduce a combination of the left and right channels of the stereo audio signal. Further, a loudspeaker may be configured to reproduce only the left, rear channel of a surround sound audio signal, and so on. An installer can connect an audio cable to one loudspeaker in a digital audio distribution network and simply daisy-chain the audio cable to the other loudspeakers in the network. Each loudspeaker may be separately configured to reproduce only a selected portion of the digital audio carried over the digital audio cable. The capability of selecting a portion of the digital audio to be reproduced locally at each loudspeaker location may be advantageously applied to significantly improve the design of digital audio distribution networks.

Audio signals may have a variety of formats, both as analog audio and as digital audio. For example, a typical analog audio signal format is a specified maximum peak-peak voltage level that may be amplified, for example, to be reproduced by a loudspeaker. Audio signals carried in digital audio use digital values to represent analog voltage levels. There are many audio transmission standards that define standard formats for both analog audio and digital audio.

There are many formats for digital audio. One example is IEC60598 Type I, or SPDIF, which is a commonly used standard. Other digital audio standards may also be used to practice various embodiments within the scope of the appended claims.

Digital audio flows in a digital audio datastream that includes one or more digital channels, each carrying serial digital audio and metadata. Metadata may be included in each digital channel, or it may be carried outside the digital channels while inside the digital audio datastream. A digital audio datastream may carry one or more audio streams, each audio stream consisting of one or more audio channels.

A SPDIF digital audio datastream carries one or more digital channels, each containing serial digital audio and metadata. Each digital channel generally includes serial digital audio that corresponds to one audio channel. SPDIF can carry one or more audio streams, each audio stream including one or more audio channels. For example, SPDIF can carry a news audio stream and a music audio stream. When each audio stream is stereo, then the digital audio datastream requires four digital channels to carry the four audio channels making up the two audio streams.

The metadata in each SPDIF digital channel includes user data that may be read, changed, and used to indicate the performance of functions, for example, by a node in the audio distribution network.

An audio stream normally corresponds to what a person listens to, and it can contain one, two, or many channels.

Stereo audio streams include a left channel and a right channel. Each audio channel typically corresponds to one digital audio channel that encodes the audio as serial digital audio.

Serial digital audio consists only of a series of audio values forming a time series, without the metadata. These values may be converted to an analog audio signal, i.e., a voltage that may be amplified to drive a loudspeaker that reproduces the analog audio signal, making the analog audio signal audible.

A single loudspeaker can reproduce only one audio channel. This channel may come from one of the digital channels in the digital audio datastream or a combination of the audio channels in the digital audio datastream. For example, a loudspeaker configured for mono reproduction of a stereo audio signal reproduces a combination of the left and right channels of the stereo audio stream.

In various embodiments, the metadata may be used to perform a variety of functions. The following are some examples:

1) Volume gain—A node can encode a gain setting into the user metadata to control the volume for that node and all downstream nodes. The gain setting can come from a user command, for example, when a user adjusts a volume control device. A downstream node can change the gain setting again so that nodes further downstream use the new gain setting. The capability of rewriting metadata is not found in analog control systems. When several analog volume controls follow one after another, the volume at each loudspeaker is affected by every upstream volume setting. A volume control may also include controls for audio tone settings (e.g., bass and treble) that control the sound in downstream loudspeakers.
2) Channel mapping—The number of audio streams and the number of channels encoded in each audio stream may be encoded into the user metadata. A loudspeaker may be configured from the metadata to reproduce a selected channel of a selected audio stream, adapting automatically to changes in the channel mapping. In one embodiment, a SPDIF encoded datastream has four channels that may carry two stereo audio streams or four mono audio streams. A loudspeaker may be configured to reproduce the left channel (for example) of one of the two stereo audio signals in the stereo mode or one of the four mono channels in the mono mode. Users may enter a user command into the system by selecting an audio stream with the use of a selector device such as a switch. The node encodes the user command and sends the encoded user command to the downstream nodes. The downstream nodes may use the encoded command to set a loudspeaker to reproduce a channel in the selected audio stream.
3) Paging—Paging stations may be encoded into the user metadata to configure one or more selected loudspeakers to stop reproducing the currently selected audio stream and to start reproducing a paging audio stream also contained in the digital audio datastream. In one embodiment, a digital audio datastream includes a music stream and a paging stream. A user may enter a command to cause the network to switch to a paging mode, and the command may include an address that determines which nodes on the network are to switch to the paging mode. When a remote station detects an encoded page command in the user metadata, and determines that the command applies to it, the remote station configures its loudspeaker to reproduce the paging stream. Two bytes of metadata may be used in a paging network to address up to 256 locations, and each location may include up to 256 remote station addresses to limit the broadcast area of the page message from the entire range of locations down to a single loudspeaker.
4) Gathering information. Nodes may be instructed to perform functions that require returning information. One node can add metadata that instructs the next node to cease normal operation and to transmit back a digital audio datastream with metadata that conveys information. Well-known methods using this approach can enable the network to map itself and to assign a unique address or name to each node. The ability of a node to return information enables nodes on the network to gather useful information from each node individually.
5) Node settings. Nodes that can be addressed individually can be instructed to change the node's settings. For example, the node may be told to vary its trim volume to balance the sound coming from a left-right speaker pair, or to change its equalization to accommodate the particular acoustics of a room. Computer software could cause only a single loudspeaker node or a pair of stereo nodes to reproduce audio while a user makes adjustments.

Figure 2:
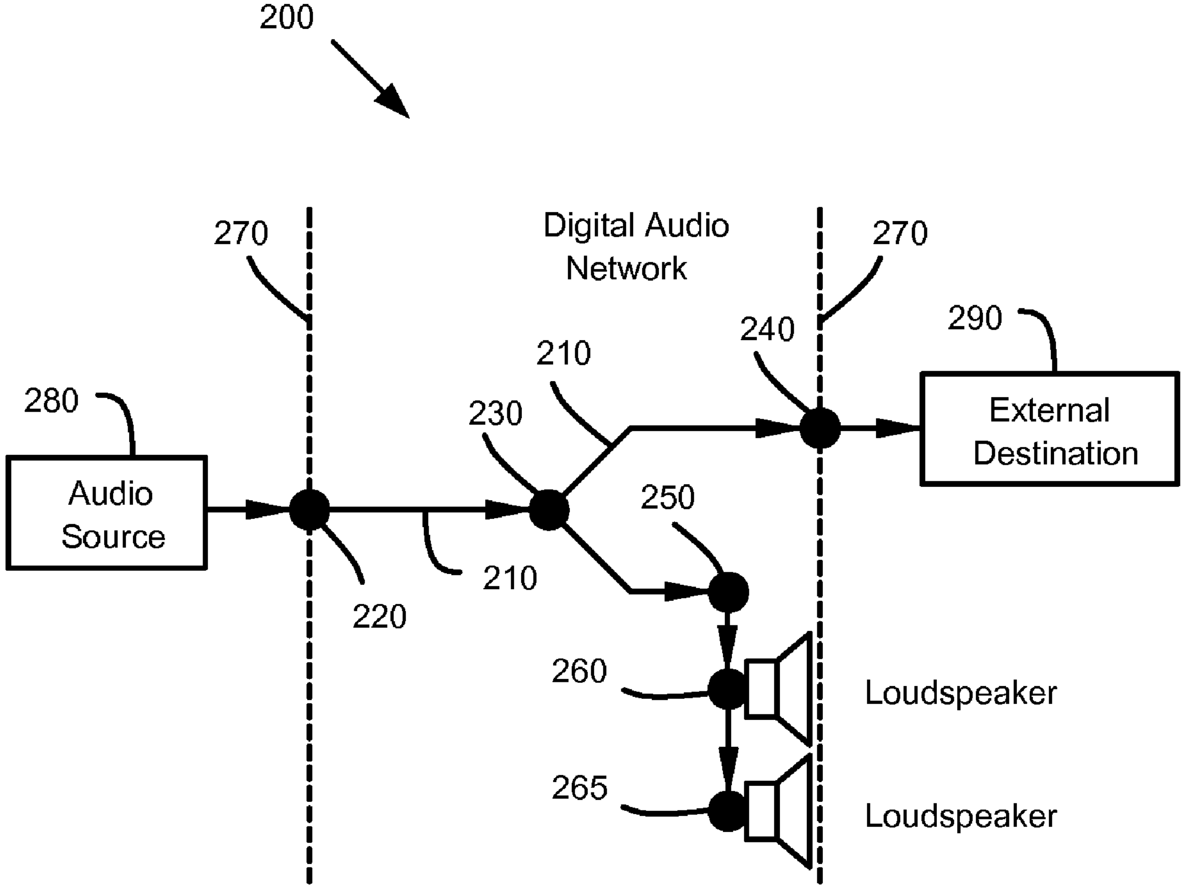
FIG. 2 illustrates an embodiment of a digital audio distribution network.

FIG. 2 illustrates an embodiment of a digital audio distribution network 200. Shown in FIG. 2 are cables 210, nodes 220, 230, 240, 250, 260, and 265, network boundaries 270, an audio signal source 280, and an external destination 290.

In FIG. 2, an audio signal enters the digital audio distribution network 200 from the audio source 280 and leaves the network at the external destination 290. The digital audio datastream propagates through the cables 210 from the source termination node 220 to the nodes 230, 240, 250, 260, and 265. Termination node 240 passes the audio out of the network to the external destination 290. The arrows indicate the direction of data flow through the cables 210.

In various embodiments, the nodes 220, 230, 240, 250, 260, and 265 perform several functions, including the following:

1) The node 230 is a hub that can receive a digital audio datastream on one cable and transmit the digital audio datastream on one or several other cables. The selection of which cable is the receiving cable and which cables are the transmit cables is called the routing. Hubs may be configured for a fixed routing, or they can automatically configure the routing. An autorouting hub detects which line has an incoming digital audio datastream, and sends that datastream to the other cables connected to the hub.
2) The nodes 260 and 265 are loudspeaker nodes that convert one channel of serial digital audio to an analog audio signal and reproduce the analog audio signal on a loudspeaker. Converting the serial digital audio to analog audio may also include decoding the metadata. Loudspeaker nodes may have configuration settings, which the node may use to select which audio channel is to be reproduced. The node 260 is also a hub.
3) The node 250 is a control node that performs processes that affect downstream nodes. For example, the node 250 sets the volume for the downstream loudspeaker nodes 260 and 265 and may also select which audio stream is to be reproduced by the downstream loudspeaker nodes 260 and 265. The nodes 250, 260 and 265 form a control branch.
4) The nodes 220 and 240 are termination nodes, which are portals that pass audio across the network boundaries 270. Termination nodes can receive or transmit digital audio datastreams, and they may convert the format of a digital audio datastream to analog audio or vice versa. A termination node may transmit or receive analog audio.

The audio formats available at the termination nodes from outside the network should generally conform to common audio transmission standards, for example, standard analog audio voltage levels or a digital audio datastream in conformance with IEC60598.

Nodes may combine some or all of the above functions in different ways to serve various applications within the scope of the appended claims. In one embodiment, one node combines the functions of a volume control, a loudspeaker node, and a hub. This node reproduces an audio signal, allows a user to set the volume level, and passes the digital audio datastream to another node that uses the same volume level. This embodiment allows a single volume control in one loudspeaker to control the volume in a pair of left and right stereo speakers.

Loudspeaker configuration settings may include a channel selector, for example, left or right, a volume trim control, and tone or equalization settings. Paging networks may include a station setting. Configuration settings may be mechanically actuated, for example, by a switch on the node, or the configuration settings may be programmed, that is, communicated to the node through the user metadata.

Loudspeaker nodes use volume gain control to control the volume of the sound they reproduce. A volume control node writes a volume gain value into the user metadata that the loudspeaker node uses to set the gain of an audio amplifier. At the lowest gain, zero, the audio produced by the loudspeaker can become inaudible; however, the audio encoded into the digital audio datastream is unchanged. Downstream nodes may set a different gain value in the user metadata, which allows downstream nodes to reproduce audio signals at an audible volume after an upstream node has set the volume to zero. A node may also use a local volume control that sets only the local volume without changing metadata in the digital audio datastream.

While the audio formats leaving the network at the termination nodes are constrained by standards, the digital audio format inside the network is not constrained. The network could, for example, use a data format similar to IEC60598 Type I with a substantially higher voltage signal level in order to maintain a high signal-to-noise ratio to reduce sensitivity to interference over a long cable run.

Figure 3:
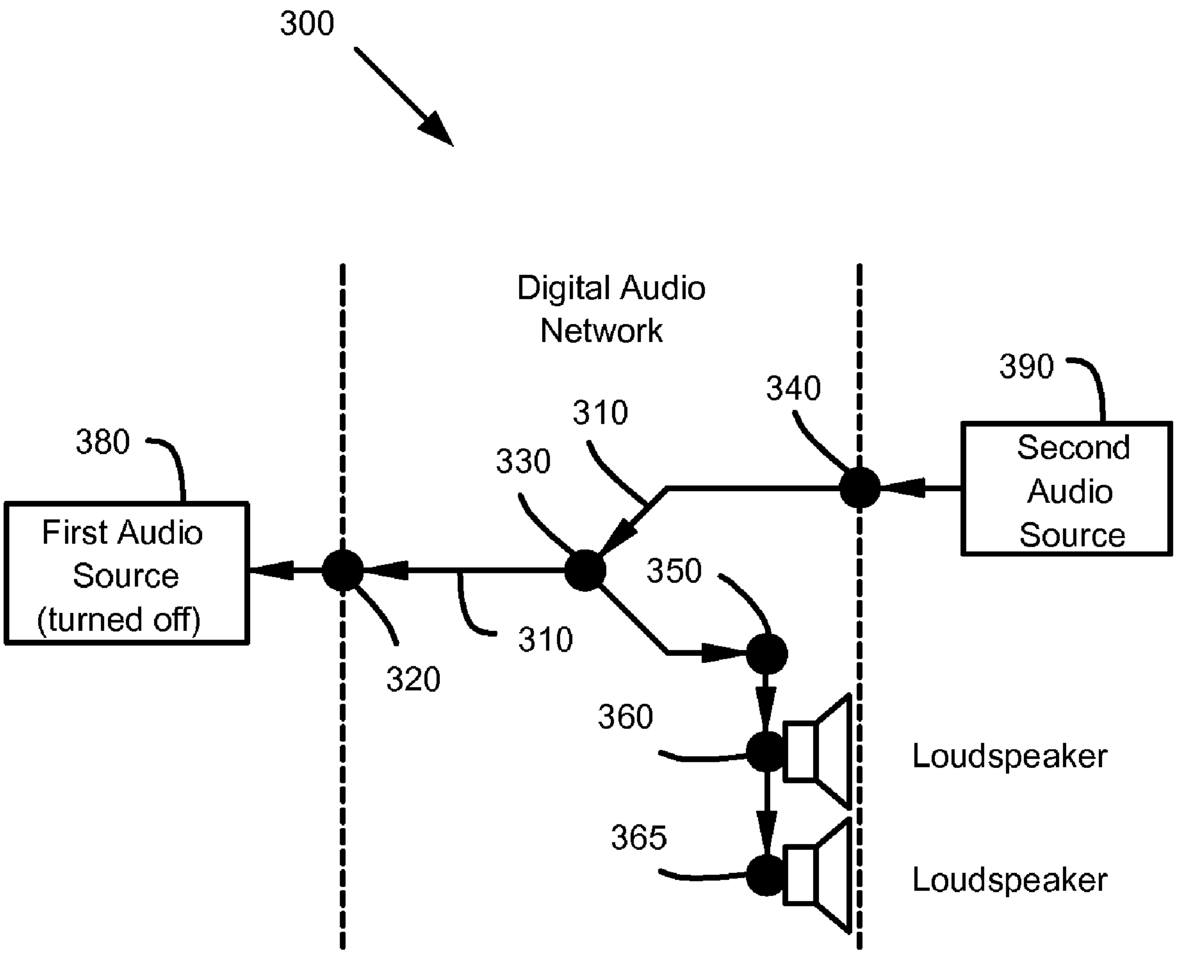
FIG. 3 illustrates the digital audio distribution network of FIG. 2 with self-routing hubs.

FIG. 3 illustrates the digital audio distribution network of FIG. 2 with autorouting hubs. Shown in FIG. 3 are cables 310, nodes 320, 330, 340, 350, 360, and 365, an audio signal source 380, and a second audio signal source 390.

In FIG. 3, the second audio source 390 replaces the external destination 290 in FIG. 2. Networks that use automatically rerouting hubs allow the use of multiple sources for audio. When the first audio source 380 is removed or turned off, each of the nodes searches for an audio signal source. When the second audio source 390 supplies an audio signal, each of the nodes 320, 330, 340, 350, 360, and 365 detects the new audio signal source and reroutes itself accordingly. Accordingly, the direction of the digital audio datastream through the nodes 320, 330 and 340 is reversed from that of the corresponding nodes 220, 230 and 240 in FIG. 2.

In self-routing networks, data collisions may occur. A data collision occurs on a transmission line when the nodes at both ends of the transmission line are transmitting data and neither of the nodes is receiving data. Nodes can be designed to ignore data collisions and to maintain routing stability as long as an audio signal source continues to supply audio, rerouting the node to receive a different audio source only when the first source is turned off or removed.

A control branch is a control node including all of the downstream nodes that respond to changes to the digital audio datastream made by the control node. The control node constitutes the beginning of the control branch. For example, nodes 250, 260, and 265 in FIG. 2 form a control branch, with the volume control node 250 constituting the beginning of the control branch. If the network continued from one of the nodes in the control branch into another room, that node could form a second control branch starting at the second volume control node. A control node by itself, for example, a speaker with a volume control, is a control branch having only one node.

When laying out a network, installers must exercise care to ensure that audio signal sources can exist only on one side of a control node. If a second source sends audio backwards through a control branch, the control will end up downstream of the loudspeakers and will not be able to change their volume.

Figure 4:
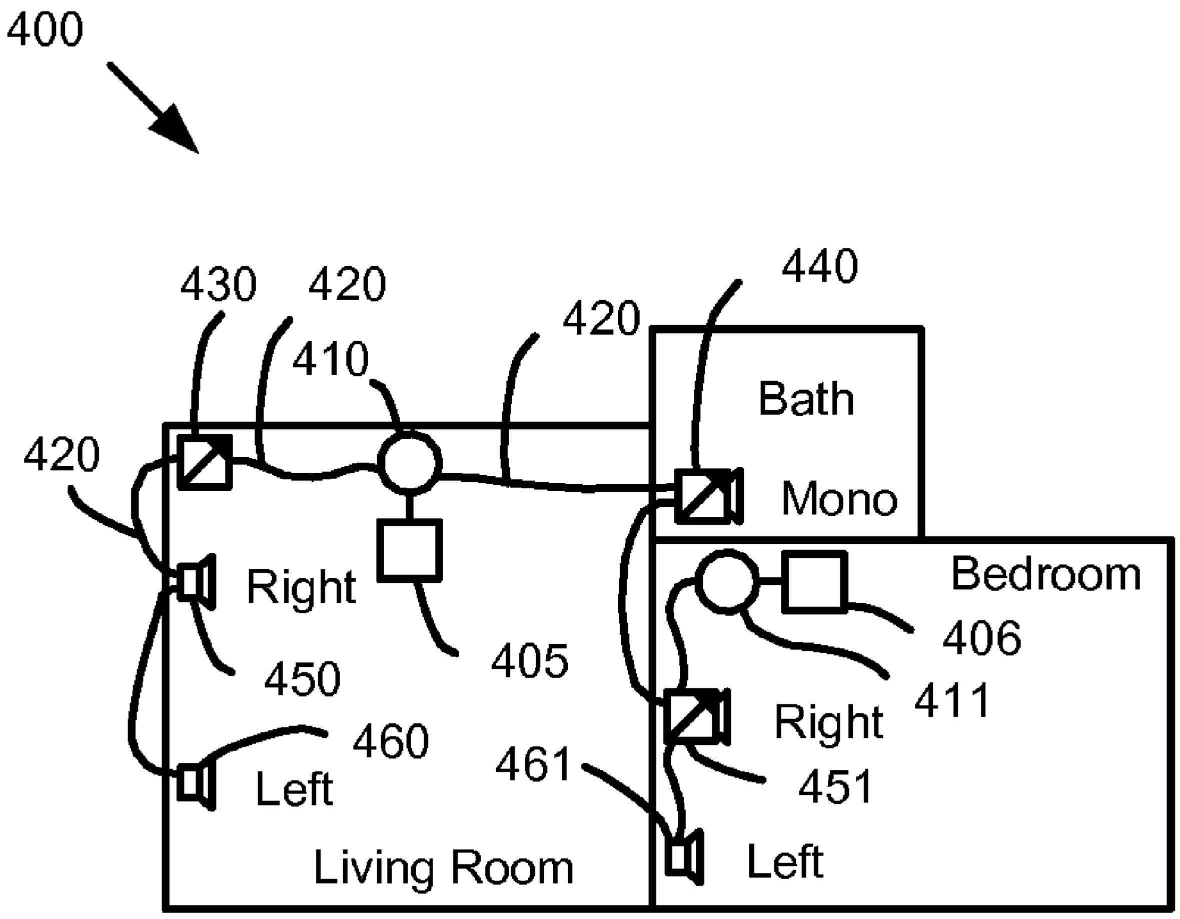
FIG. 4 illustrates a digital audio distribution network for a home that incorporates several improvements over previous network designs.

FIG. 4 illustrates a digital audio distribution network 400 for a home that incorporates several improvements over previous network designs. Shown in FIG. 4 are audio sources 405 and 406, hubs 410 and 411, cables 420, a volume control node 430, a mono loudspeaker node 440, and stereo loudspeaker nodes 450, 451, 460, and 461.

In FIG. 4, the digital audio distribution network 400 starts with an audio signal source 405 that sends an audio signal to the hub 410. The audio signal may be a digital audio datastream or an analog audio signal that the node converts into a digital audio datastream. In one embodiment, the audio signal source 405 is a home stereo or a home entertainment system. Other devices may be used according to well-known techniques to practice various embodiments within the scope of the appended claims. The hub 410 sends the digital audio datastream through the cable 420 to the volume control node 430. In one embodiment, the cables 420 are each a single twisted pair. Other types of cables may be used according to well-known techniques to practice various embodiments within the scope of the appended claims. The volume control node 430 controls the volume level for the control branch that connects to the stereo loudspeaker nodes 450 and 460. The loudspeaker nodes 450 and 460 are set so that the loudspeaker node 450 reproduces the right channel of stereo audio and the loudspeaker node 460 reproduces the left channel.

The hub 410 also sends the digital audio datastream to the mono loudspeaker node 440. The mono loudspeaker node 440 passes the digital audio datastream to the two stereo loudspeaker nodes 451 and 461. In one embodiment, the loudspeaker node 451 is similar to the loudspeaker node 450, except that the loudspeaker node 451 has a built-in volume control that also controls the volume level at the loudspeaker node 461. The loudspeaker nodes 451 and 461 form a control branch in the network 400. The mono loudspeaker node 440 is a control branch having a single node. The volume level of the loudspeaker node 440 is controlled separately from the volume level in the control branch with the loudspeaker nodes 451 and 461 because the loudspeaker node 451 replaces the volume level set by the mono loudspeaker node 440 with the volume level set from its built-in volume control.

The second audio signal source 406 in the bedroom may be, for example, a TV. When the audio signal source 405 in the living room is turned off, the network 400 reroutes itself automatically according to this invention to distribute the audio from the TV audio signal source 406 throughout the house.

Power connections for the nodes in FIG. 4 may be made, for example, by connecting directly to in-wall mains wiring, by an AC cord that plugs into an AC wall outlet, or by an AC Adapter that plugs into a wall outlet to provide low voltage power to the node.

In FIG. 4, the digital audio distribution network 400 implements a hybrid topology of cables that mixes tree and line topology and has multiple sources. Each cable consists of a single unshielded twisted pair. The topology used in FIG. 4 is one way to wire the network, but it may be organized in many different ways while preserving its functionality. Prior art audio networks have fixed audio sources and destinations. Unlike these networks, a digital audio datastream may branch off from any node to expand the network. The only constraint in the network is that control branches require controlled loudspeakers to be routed downstream from the control node. To do this with one of the prior art networks, one would have to install a second network, connecting it to the first.

Another aspect of the digital audio distribution network 400 is that every node receives all of the digital audio datastream regardless of how the audio data is processed in the upstream nodes. For example, even if a volume control node effectively turns off the sound to a loudspeaker, the downstream nodes are still capable of reproducing the audio signal at full volume.

Yet another aspect of the digital audio distribution network 400 is that it can be powered from the mains wiring inside the walls. More generally, it integrates into standard structural wiring by using standard structural wiring terminals, such as screw terminals and wire slot terminals to tap into the mains wiring. The low-voltage digital audio cables may be connected to the nodes, for example, at punch-down terminals. These connection methods advantageously simplify the layout of both the power and the audio signal data wiring.

The network boundaries 270 in FIG. 2 frequently coincide with the walls of a structure. The components in FIG. 2 located between the boundaries 270 are generally built into the walls. Some parts of the network may be located outside the walls, for example, speakers placed on the floor or on a shelf, or an entertainment center placed against a wall. These devices may obtain power using a standard AC plug that plugs into a wall outlet, or they may obtain power from an AC adapter.

The aspects of network design described above facilitate the construction of simple, intuitive, flexible, and reliable networks for the distribution of high quality digital audio that can provide consumers with significant advantages, including the following:

1) The network can distribute audio over an arbitrary topology of cables, each cable consisting of only a single unshielded twisted pair. This reduces cost and gives the network simplicity and unlimited flexibility to expand and grow. Unshielded twisted pairs are all a careful designer needs to ensure uncorrupted flow of digital audio through the network, ensuring that consumers will hear high quality audio signal reproduction.

2) Configuring loudspeaker nodes to play selected the parts of the digital audio datastream while passing all of the audio information to downstream nodes increases system flexibility and reduces the costs of network installation. Control branches enable the network designer to produce layouts that are straightforward and intuitive for the system installer to install and for the user to use.

3) Using standard punch-down connections for the network cable connections expedites the network installation while providing reliable, maintenance-free connections. Because electrical installers routinely use punch-down terminations, installation costs are held to a minimum without sacrificing reliability.

4) Connecting to in-wall mains power frees the network from constraints associated with powering remote nodes. Adding extra terminals facilitates routing the mains power throughout the structure.

5) Audio networks can distribute background music and interrupt the music at selected stations or in selected areas for paging.

6) Networks can be self-healing, that is, if a connection between nodes fails, the hubs can reroute the connection through other nodes automatically.

7) Network cables can carry power for low-power nodes.

Figure 5:
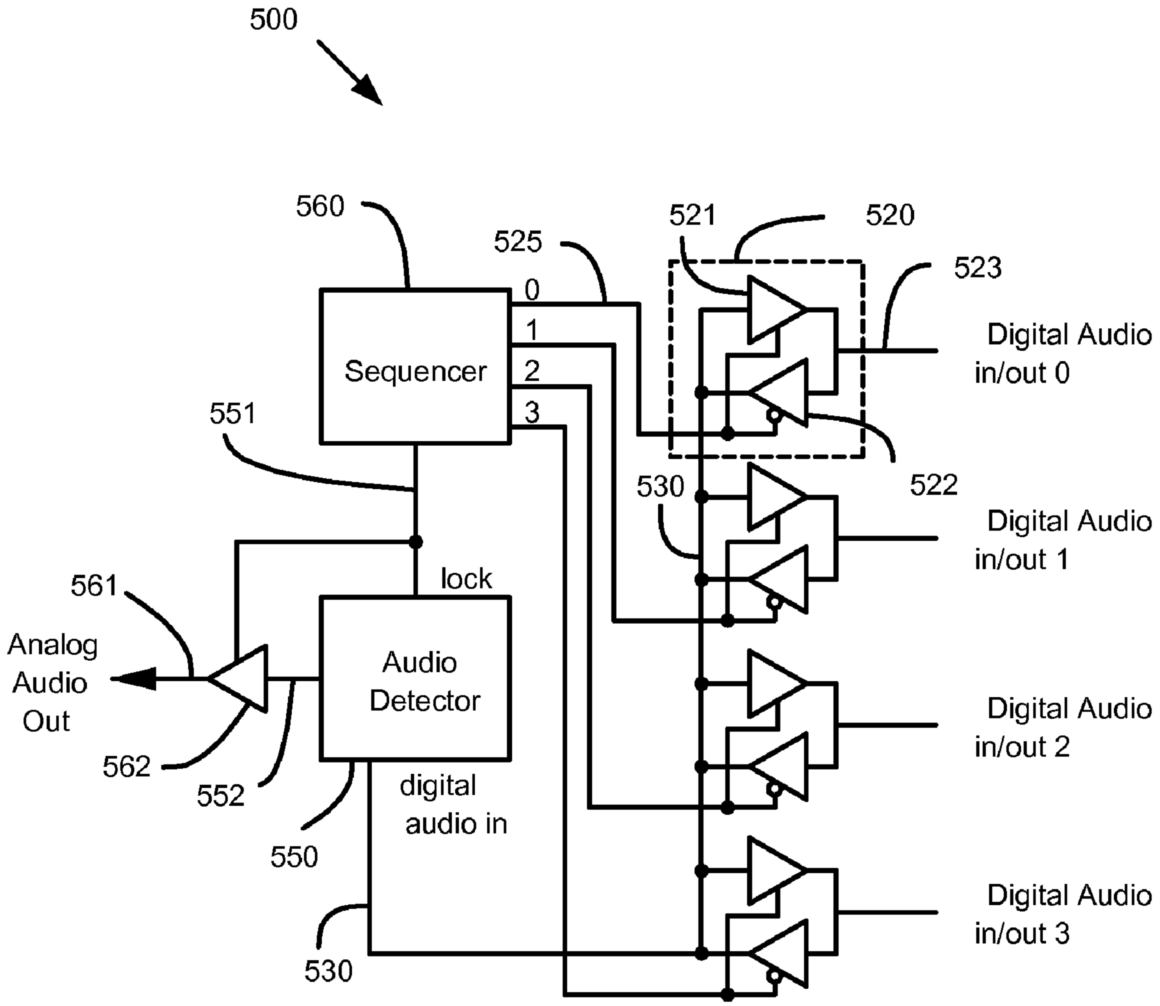
FIG. 5 illustrates an embodiment of a self-routing digital hub.

FIG. 5 illustrates a self-routing digital hub 500. Shown in FIG. 5 are digital transceivers 520, a transmit buffer 521, a receive buffer 522, external in/out lines 523, control lines 525, a digital audio input line 530, an audio detector 550, an audio detector lock line 551, an analog audio output line 552, a sequencer 560, a mute buffer output line 561, and a mute buffer 562.

In FIG. 5, each of the digital transceivers 520 connect the hub 500 to one of the cables that connect each of the external in/out lines 523 to another node in the network. Each of the digital transceivers 520 includes a transmit buffer 521 and a receive buffer 522 configured so when the sequencer 560 drives one of the control lines 525 low, the corresponding digital transceiver 520 disables its transmit buffer 521 and enables its receive buffer 522 to receive the audio signal datastream on the audio signal input line 530. When the sequencer 560 drives the control line 525 high, the digital transceiver 520 enables its transmit buffer 521 to drive the cable connected to the digital transceiver 520 by the external in/out line 523 with the audio signal datastream on the audio signal input line 530 and disables its receive buffer 522. The hub 500 in this example includes four digital transceivers 520 to accommodate up to four nodes; however, a different number of digital transceivers 520 may be used to accommodate any number of nodes to practice various embodiments within the scope of the appended claims.

The digital transceivers 520 are controlled by the sequencer 560, which includes one control line 525 for each corresponding digital transceiver 520. The sequencer 560 sets only one control line 525 low at a time to allow a digital audio datastream to enter the hub 500 from only one of the external in/out lines 523. Accordingly, the receive buffer 522 of the corresponding digital transceiver 520 is enabled, while its transmit buffer 521 is disabled. Conversely, the sequencer 560 sets the remaining control lines 525 high to disable their receive buffers 521 and enable their transmit buffers 521 to drive their external in/out lines 523 with the digital audio datastream on the digital audio input line 530.

The audio detector 550 receives the digital audio datastream, if any, from the digital transceiver 520 selected by the sequencer 560. In one embodiment, the audio detector 550 is a UDA1351 codec that detects an IEC60598 digital audio datastream and converts the digital audio datastream to an analog signal. When the audio detector 550 detects the presence of a valid digital audio datastream, the audio detector 550 sets the lock line 551 high to signal the sequencer 560 to halt the search for a digital audio datastream. For hub 500, loss of audio means that a valid digital audio datastream is no longer present on the line. The audio detector indicates the loss of the datastream by setting lock line 551 low.

The sequencer 560 drives one of the m control lines 525 low and the others high. In the example of the hub 500, m=4 control lines 525. The sequencer 560 sets each control line 525 high in a sequence, one after another, for a time duration T1, which is sufficiently long to allow the audio detector 550 to detect an incoming digital audio datastream.

The analog audio output line 552 is a byproduct of some audio detectors. Some embodiments benefit from a mute buffer 562 that drives the analog audio signal output line 561 only when the audio detector lock line 551 is high.

Figure 6:
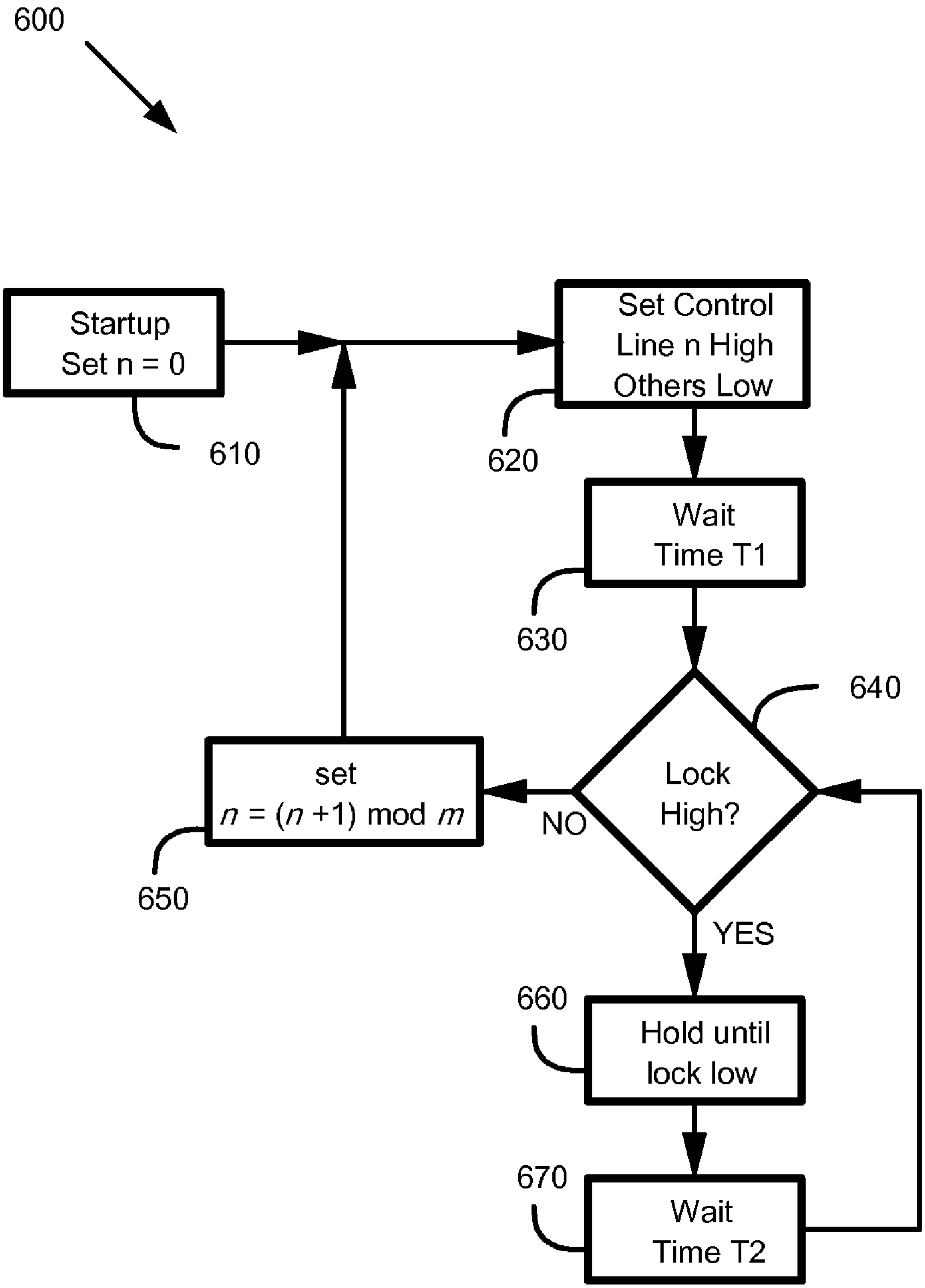
FIG. 6 illustrates a flow chart for the sequencer in FIG. 5.

FIG. 6 illustrates a flow chart 600 for the sequencer 560 in FIG. 5.

In step 610, the hub 500 is initialized, and the sequencer 560 sets the control line index "n" to "0".

In step 620, the sequencer 560 drives the selected control line 525 low to enable the receiver buffer 522 on the corresponding digital transceiver 520.

In step 630, the sequencer 560 waits for an interval T1 to allow the audio detector 550 sufficient time to detect the presence of a valid digital audio datastream.

In step 640, if the lock line 551 is low after the interval T1 expires, then the flow chart continues from step 650. Otherwise, the flow chart continues from step 660.

In step 650, the sequencer 560 increments the control line index to select the next control line 525, and the flow chart continues from step 620.

In step 660, the sequencer 560 exits the loop and waits until the lock line 551 goes low. The audio signal detected on the digital audio input line 530 flows out on the external in/out lines 523 from all of the other digital transceivers 520.

In step 670, when the lock line goes low, the sequencer 560 waits for a second interval T2 before continuing from step 640. The interval T2 wait allows for a momentary interruption of the digital audio datastream before returning to the search loop.

Other devices and methods for a self-routing hub in addition to the examples described above may be used according to well-known techniques to practice various embodiments within the scope of the appended claims.

Figure 7:
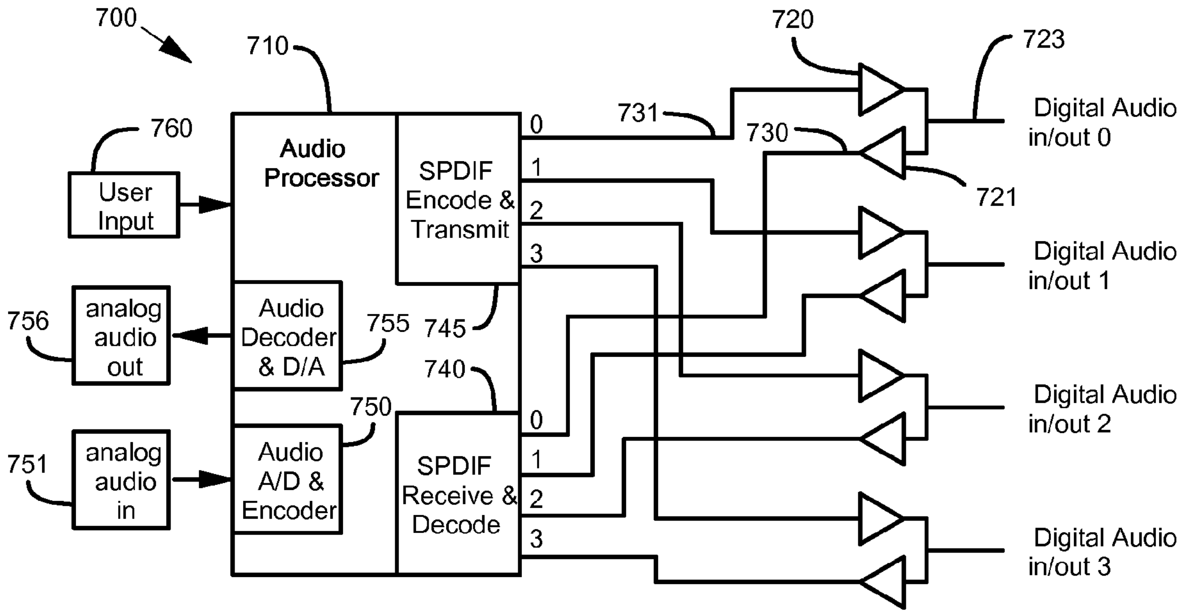
FIG. 7 illustrates an embodiment of a self-routing general-purpose node.

FIG. 7 illustrates an embodiment of a self-routing general-purpose node 700. Shown in FIG. 7 are an audio processor 710, digital transmitters 720, digital receivers 721, digital audio data cables 723, digital audio input lines 730, digital audio output lines 731, a SPDIF decode and receive module 740, a SPDIF encode and transmit module 745, an A/D converter and encoder 750, an analog audio signal input 751, a decoder and D/A converter 755, an analog audio signal output 756, and a user input 760.

In FIG. 7, the general-purpose node 700 is built around an audio processor 710. This example assumes IEC60598 (SPDIF) data formats. There are many audio processors capable of serving this purpose, some with appropriate interfaces integrated into the processor and others that would require additional interfaces. A general-purpose node may be built using programmable processors, for example, the MFC5253, the ADAU1701, and a CODEC designed specifically for the purpose. In another embodiment, a general-purpose processor includes an MSP430F2132 processor, a PCM3060 codec, and a DIX4192 digital audio receiver/transmitter.

A general-purpose node can perform the functions of a self-routing hub like the hub 500 of FIG. 5. In contrast to the hub 500, this example general-purpose node 700 has four separate digital audio input lines 730 and four separate digital audio output lines 731. Another difference is that general-purpose node 700 can receive an analog audio input in addition to digital audio inputs.

The audio processor 710 includes a SPDIF receiver 740 which can receive and decode the SPDIF data, breaking it into its constituent parts. The audio processor 710 can select one digital audio input line 730 to receive and route to the transmitter 745. The transmitter 745 can encode the constituent parts back to a SPDIF format that the transmitter 745 can send through any combination of the digital audio output lines 731. For example, if the audio processor 710 receives on line 0 of the digital audio input lines 730, the audio processor 710 can selectively enable lines 1-3 of the digital audio output lines 731. The digital audio in/out cables 723 are bidirectional and can transmit or receive a digital datastream. In one embodiment, the digital audio in/out cables 723 are each a single twisted pair of unshielded insulated copper wires.

The receiver 740 in the audio processor 710 can detect an incoming digital audio datastream on any of the digital audio input lines 730 and/or an analog audio signal on the analog audio input line 751. If the SPDIF decode and receive module 740 receives an analog audio signal on the analog audio input line 751, the audio processor 710 digitizes the analog audio signal at an appropriate sample rate in the A/D converter and encoder 750.

The general-purpose node 700 has the ability to use more comprehensive criteria than hub 500 for determining the presence or loss of audio. The audio processor 710 can determine whether the analog audio signal input 751 is a valid audio signal by measuring its amplitude, frequency spectrum, or other criteria according to well-known techniques. Whereas hub 500 determines the presence of a signal based on the validity of the digital audio datastream, general-purpose hub 700 can also examine the nature of the audio carried by a valid digital audio datastream. The audio processor 710 can decode the analog audio signal from the digital audio datastream and apply the same criteria to it that it would to an analog audio input. This way it can avoid locking onto a digital audio datastream that transmits null audio data, e.g., a series of zeros, a constant value, or white noise.

The functions of the sequencer 560 in FIG. 5 are accomplished internally in the audio processor 710, and the search loop may include the analog audio input 751 as well as the digital input lines 730 to provide the network the capability to receive both analog signals and digital audio. The audio processor 710 can convert the analog audio signal from the analog audio input 751 to serial digital audio, incorporate the serial digital audio into a digital audio datastream, and transmit the digital audio datastream through the external in/out cables 723. The audio processor 710 can extract serial digital audio from a digital audio datastream, convert the serial digital audio to an analog audio signal in the decoder and D/A converter 755, and transmit the analog audio signal out through the analog audio output 756 in the same manner as the audio detector 550 in FIG. 5, with the additional capability of transmitting the analog audio signal entering the network from the analog audio signal input 751 out the analog audio signal output 756.

In addition to the functions described above, the audio processor 710 can read and change the digital audio datastream metadata and receive and act on user commands received at the user input 760. The information from the user input 760 may come from a variety of devices, for example, pushbuttons, slide switches, and knobs. User settings may also be input by well-known computer programming methods, for example, from a serial data port, or through digital audio metadata. The user input 760 may be used to control only the function of a local node and also to control the function of other nodes by changing the user metadata of the digital audio datastream. The metadata are decoded from the incoming data by the receiver 740, and encoded for sending out by the SPDIF encode and transmit module 745. The processor has the ability to combine incoming metadata with information it receives from the user input and broadcast the revised metadata or totally new metadata from the SPDIF encode and transmit module 745.

Figure 7A:
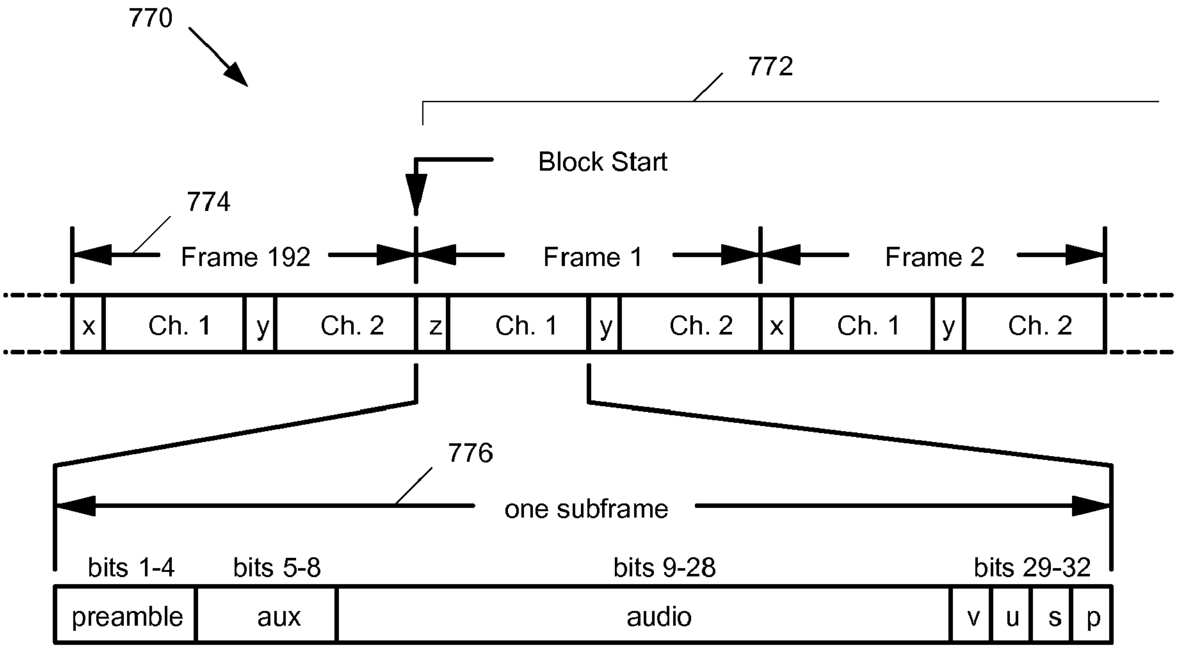
FIG. 7A illustrates a diagram of the format of SPDIF data.

FIG. 7A illustrates a diagram 770 of the format of SPDIF data. Shown in FIG. 7A are blocks 772, frames 774, and subframes 776.

In FIG. 7A, the format of SPDIF data is similar to other digital audio standards. Data are encoded as a series of bits forming blocks 772, frames 774, and subframes 776. Each subframe 776 holds 32 bits of data. The first four bits of each subframe 776 is a preamble. The labels "x", "y" and "z" indicate different preamble codes. The "z" code identifies the beginning of a block of data, which is also the beginning of the first frame 774. Subsequent frames 774 are identified with the "x" code. SPDIF blocks use 192 frames of data, so the "x" code is repeated 191 times, until it is replaced with a "z" code at the start of the next block 772. Each frame 774 holds two subframes 776, with the first subframe 776 identified by either an "x" or a "z" code, while the second subframe 776 is identified by the "y" code. The first subframe 776 in each block 772, identified as channel 1, is the left channel for a stereo audio signal, and the second subframe 776, or channel 2, is the right channel. Bits 9-28 of each subframe 776 hold 20 bits of audio data, and the auxiliary section (bits 5-8) can hold an additional 4 bits of audio data. The last four bits include one bit "v" for data validity, one bit "u" for user data, one bit "s" for status data, and one bit "p" for parity.

One block 772 of SPDIF data provides 192 bits or 24 bytes of user data for each channel. The format of the user data may vary with the application. Table 1 provides one example of a template that may be used for user data:

TABLE 1

| Bytes | Description |
|---|---|
| 1 | Preamble (for identification) |
| 2-3 | Volume level |
| 4-5 | Tone settings |
| 6 | Audio stream (for multi-stream audio) |
| 7 | Channel number (1 for channel 1 and 2 for channel 2 for stereo) |
| 8 | Paging station |
| 9 | Paging area |
| 10-11 | Paging volume |
| 12-13 | Attention bits |
| 14-24 | Available for other purposes |

The format of the status data bits is fixed by convention; however, the user data bits may be used without restrictions to suit any desired application. For example, the metadata may communicate information for controlling the settings that are used to reproduce the audio signal, such as volume and frequency response. In one embodiment, the amplifier and/or the loudspeaker nodes in the digital audio distribution network read and rewrite the metadata. Rewriting the metadata means replacing incoming metadata values with new values as the audio datastream is passed on to the next node in the digital audio distribution network. The new metadata values are communicated to the downstream nodes. Because rewriting the metadata does not alter the encoded serial digital audio, the metadata may be rewritten multiple times as the digital audio datastream propagates through the digital audio distribution network.

While the user metadata bits are communicated at a far lower bit rate than the serial digital audio, the user metadata bits are still communicated quickly. For example, with an audio sample rate of 48 kHz, the metadata sample rate is 250 Hz for each channel, which allows the user control settings to be adjusted quickly without the perception of a time delay during the adjustments.

Figure 7B:
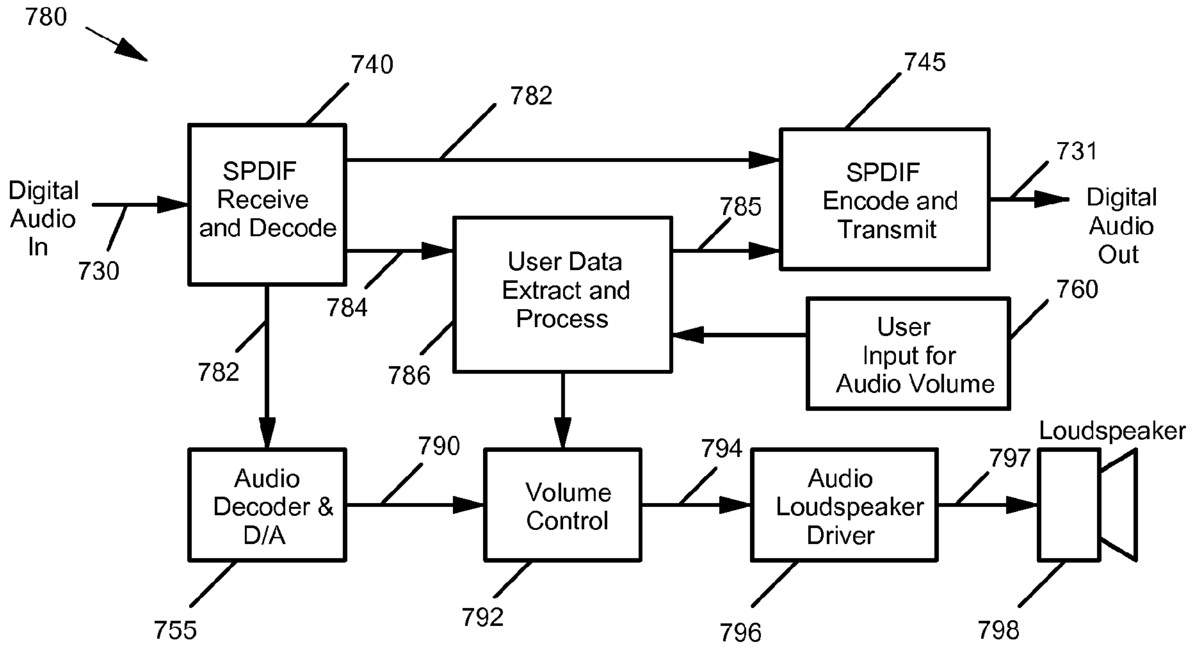
FIG. 7B illustrates a detailed block diagram of an audio processor for a self-routing loudspeaker node based on the general-purpose node in FIG. 7 and the IEC60598 (SPDIF) data format of FIG. 7A.

FIG. 7B illustrates a detailed block diagram of an audio processor 780 for a self-routing loudspeaker node based on the general-purpose node in FIG. 7 and the IEC60598 (SPDIF) data format of FIG. 7A. Shown in FIG. 7B are a digital audio input line 730, a digital audio output line 731, a SPDIF receiver and decoder 740, a SPDIF encoder and transmitter 745, an audio decoder and D/A converter 755, a user input volume selector 760, serial digital audio 782, user data 784 and 785, a user data extractor/processor 786, analog audio signals 790, 794, and 797, a volume control 792, an audio loudspeaker driver 796, and a loudspeaker 798.

In FIG. 7B, the digital audio datastream on the digital audio input line 730 is decoded to obtain serial digital audio 782 and user data 784. In one embodiment, the audio processor 780 implements the SPDIF receiver and decoder 740 with a dedicated IEC60598 decoder module that is designed into the audio processor 780. The user data extractor 786 inspects the user data 784 decoded from the incoming SPDIF data to extract the volume level setting, if it is available. If a volume setting from the user input volume selector 760 is available, the user data processor 786 replaces the incoming volume level setting with the user's volume setting to produce revised user data 785. The SPDIF encoder and transmitter 745 combines the serial digital audio 782 with the revised user data 785 to encode the outgoing digital audio datastream 731. The serial digital audio 782 from the SPDIF receiver/decoder 740 also goes to the audio decoder and D/A converter 755, which creates the analog audio signal 790. The volume control 792 adjusts the volume according to the volume level set by the user data extractor 786. The volume-adjusted analog audio signal 794 is received by the audio loudspeaker driver 796, which creates a loudspeaker-level audio signal 797 to drive loudspeaker 798 to produce an audible sound.

In one embodiment, the general-purpose node 700 detects data collisions, which gives it additional capabilities. For example, when a digital audio datastream is received at digital audio input 0 and transmitted from digital audio outputs 1-3, the digital audio inputs 1-3 are not being used. The audio processor 710 uses one digital audio detector in the SPDIF receiver 740 to monitor digital audio input 0. The audio processor 710 uses a second digital audio detector to monitor the digital audio output lines 1-3 in a repeating cycle. When the second digital audio detector receives only the data that audio processor 710 is transmitting, it locks normally on each of the digital output lines 1-3. If another node is transmitting a different digital audio datastream into one of the digital output lines, there is a data collision. This data collision should prevent the second detector from locking on a particular digital output line.

There are many devices that are capable of detecting digital audio and locking on the digital audio when they determine that the digital audio is valid. When there is a data collision on a line, the competing datastreams will usually prevent the detector from detecting either of the datastreams as valid. Therefore the detector will not normally lock when there is a collision on a line. If two nodes are close together, and both nodes are transmitting the same digital audio datastream, the detector might lock on the datastream. This case would not present a problem because this situation is normal for self-healing networks.

When the second detector is unable to lock on a line, the audio processor 710 can halt data transmission on that line and read the incoming metadata. If it receives a valid incoming digital audio datastream, it can read the attention bits in the user metadata. If it finds a particular value in the attention bits, it may signal the audio processor 710 to stop receiving a digital audio datastream on line 0 and instead receive a digital audio datastream on line 1. If the attention bits received at digital output line 1 do not signal the audio processor 710 to stop receiving a digital audio datastream on input line 0, the audio processor 710 continues to receive the digital audio datastream, and the data collision on digital output line 1 does not degrade the operation of the digital audio distribution network.

In this invention, an attention-sensitive node is defined as a node that detects data collisions, checks the attention bits in the incoming digital audio datastream, and has the ability to implement a response that depends on a value in the attention bits in the user metadata.

In another embodiment, data collisions may be created by signals that are not digital audio datastreams. For example, a node can use an attention-getting signal with a frequency spectrum that is outside the frequency spectrum of the digital audio datastream. The audio processor 710 can detect this signal according to well-known techniques and perform a function in response to the attention-getting signal.

Figure 8:
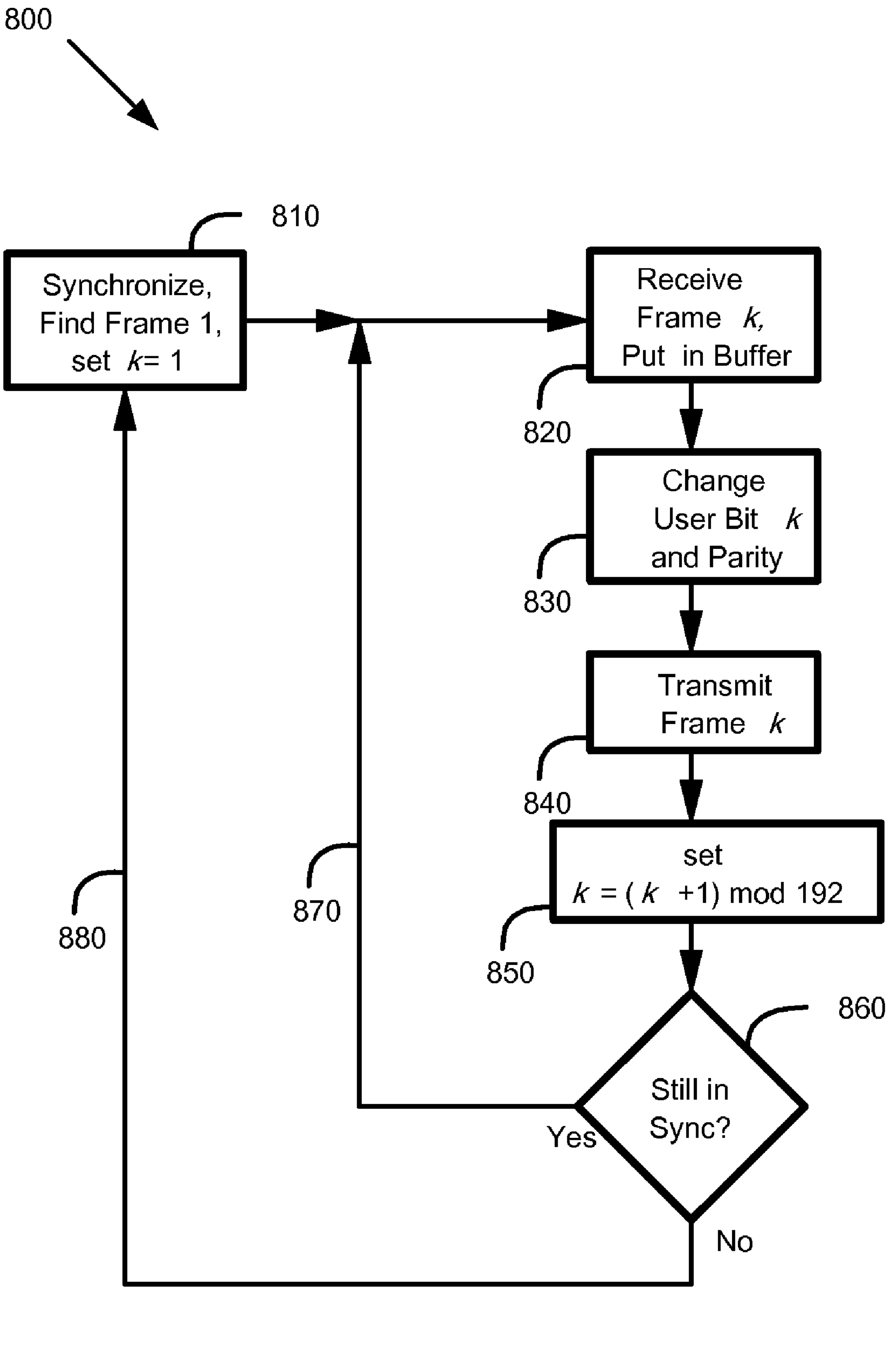
FIG. 8 illustrates a flow chart for writing user metadata in a digital audio datastream for the audio processor of FIG. 7.

FIG. 8 illustrates a flow chart 800 for writing user metadata in a digital audio datastream for the audio processor of FIG. 7. The user data holds 192 bits of user data for each frame and for each channel. Prior to writing new user data, the audio processor can create a template using the incoming user data or by simply setting all 192 bits to zero. The audio processor encodes the new information into this template and holds it in a buffer until it is written into the user metadata. If the user data changes, for example, as a result of user input, the audio processor can rewrite the buffer with the new user data.

In step 810, writing metadata starts with the audio processor synchronizing with the digital audio datastream by identifying the first frame of a data block.

In step 820, when the audio processor receives the first frame, the audio processor places the frame into a buffer.

In step 830, the user bit of the current subframe is set to the value of the corresponding bit in the user data template.

In step 840, the audio processor transmits the frame with the user metadata.

In step 850, a loop counter k is incremented to the next frame number modulo 192.

In step 860, the audio processor confirms that the incoming data are still in sync. If yes, then the cycle repeats from step 820. If no, then the cycle starts over at step 810. The audio processor writes the next bit of user metadata and so on until all 192 bits of user data from the user data template have been written into the user metadata. The cycle starts over from step 810 when the loop counter k increments to zero at the modulus value 192 in step 850.

When serial digital audio is created from the analog audio input, the audio processor receives each digital audio frame from a digital encoder inside the audio processor. The audio processor may use the same steps shown in FIG. 8 to read incoming user data and to merge the user data and the serial digital audio into the digital audio datastream. Manufacturers provide an array of tools and development kits for implementing the audio processor 710 that include programming tools providing high-level access to the digital audio data that passes through the processor. The capability to read and rewrite the user metadata contributes significant advantages to controlling a digital audio distribution network.

The general-purpose node draws AC power, and modules designed for in-wall mounting may include an internal power supply while other modules may use AC adapters. The general-purpose node includes loudspeaker subsystems with speakers and the electronics modules necessary to drive them. The loudspeaker modules and power supplies may be implemented according to well-known techniques to practice various embodiments within the scope of the appended claims.

Many audio distribution networks require no more than a local volume control for each speaker, for example, a knob or a remote control. Such a network may be served, for example, with the hub 500 in FIG. 5 and a loudspeaker subsystem with a volume control knob. However, many audio distribution networks require volume controls that can vary the volume of more than one speaker. Home audio distribution networks with stereo speakers typically require a single control for both left and right speakers. Other audio distribution networks may require a single volume control for each room, or for each defined area. The ability to change the user metadata facilitates control of multiple loudspeakers with a single area volume control. Also, the volume may be varied without changing the original audio data so that audio may be played at a normal volume level downstream from a node that has the volume turned all the way down.

To control multiple speakers, a volume control incorporates the user input as a volume level into the metadata. If the volume control is part of a loudspeaker node, then the volume control is also used to control that loudspeaker's volume. Downstream loudspeaker nodes can each read the volume level from the metadata and control their volume levels accordingly.

Speakers in a control branch often require their own local volume controls in addition to the area volume control, for example, to adjust speakers individually to obtain a reasonable volume balance through an area or to make one speaker quieter or louder than the others in an area. These volume controls, called trim volume controls, may be volume level settings that are hidden and rarely changed, or they may be designed for routine user adjustment.

The IEC60598 (SPDIF) standard is most commonly used to transmit two channels of digital audio, but it has the ability to carry more than two channels. Metadata may be used to identify each channel to facilitate the operation of a channel selector. For example, a value may be set in the metadata for channels 1 and 2 that identify them as stereo channels, for example, for music, while channel 3 may be identified as a mono channel in a different datastream, for example, TV commentary. A channel selector on the left speaker for a stereo pair will play the left channel if the channel selector is set for music or the mono channel if the channel selector is set for TV commentary. A node can determine how many datastreams are available and how many channels are available for each datastream, and the node can set rules for how to handle situations when a user requests a datastream that does not exist.

Metadata also provide a convenient means to implement paging. A paging network that normally distributes background music can identify specific stations or groups of stations that may be set to broadcast a page message. Each loudspeaker is assigned a station identification that is used to address one or more specific loudspeakers in the network. Some networks may also include group identifications. Two bytes of identification are sufficient to identify 65000 loudspeaker stations.

A paging network may use paging electronics, such as a microphone and a microphone amplifier at a source node. In one embodiment, background music and paging audio are combined into an ordinary stereo stream, with music using one channel (e.g., the left channel), and the paging audio using the other channel (i.e., the right channel). All of the loudspeaker nodes may be set to reproduce the music channel by default. The node that combines the music and the paging audio is the paging node. A paging network may use part of the metadata to identify stations to be paged. When no stations are to be paged, the metadata will indicate that no stations are selected for paging. To page one station, the paging node would place the identifier for that station into the metadata.

Each loudspeaker node continually checks the metadata for its identifier. Upon detecting its identifier, the loudspeaker node switches from the music channel to the paging channel. When the station identifier is removed from the metadata, the loudspeaker node switches back to the music channel. A paging network can page groups of stations by defining rules for identifying groups. Loudspeaker nodes may also set a different volume level for paging than for music.

Figure 9:
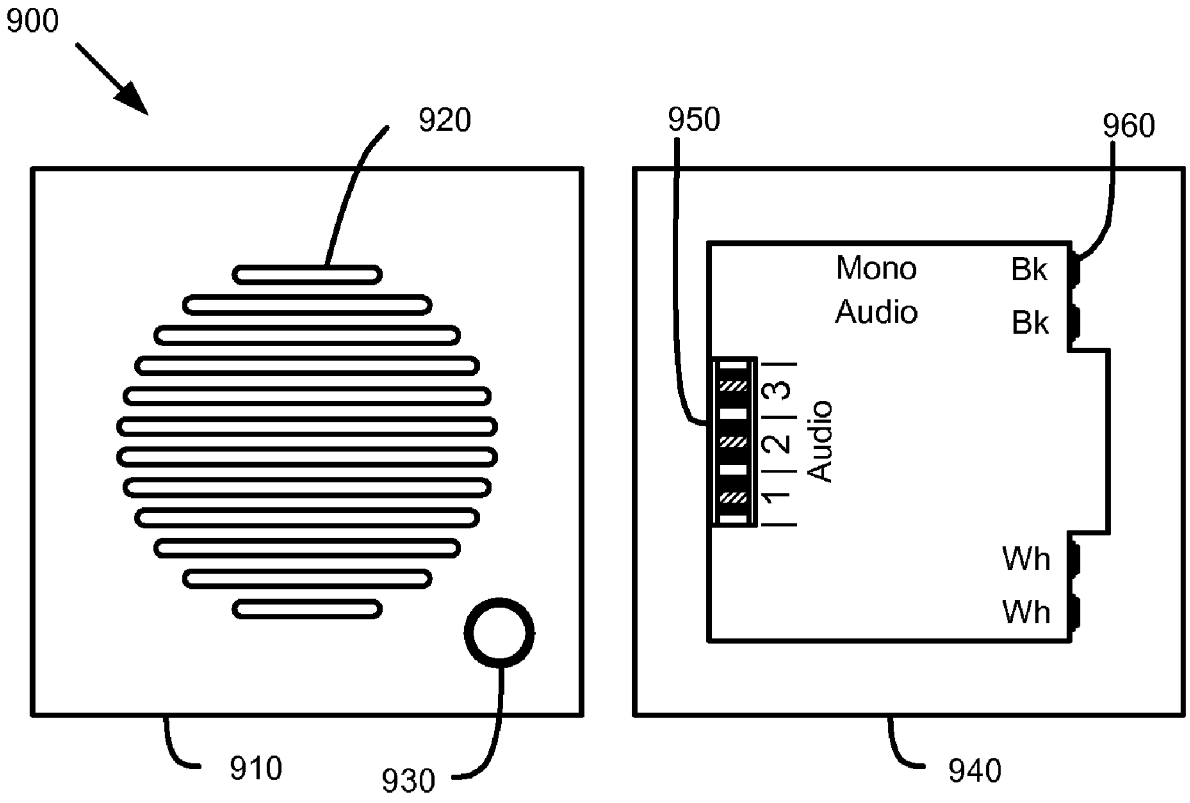
FIG. 9 illustrates a mono loudspeaker node designed to mount in a standard in-wall electrical junction box.

FIG. 9 illustrates a mono loudspeaker node 900 designed to mount in a standard in-wall electrical junction box. Shown in FIG. 9 are a faceplate 910, a grill 920, a control knob 930, a back panel 940, punch-down terminals 950, and screw terminals 960 for connecting to mains power.

In FIG. 9, the faceplate 910 includes a grill 920 that covers a speaker behind the faceplate 910 inside a standard 4"×4" electrical junction box. The volume control knob 930 allows a user to set the desired volume level. In other embodiments, the volume control may be a slide control or a set of pushbuttons. This speaker node is useful for bathrooms and other small spaces.

The back panel 940 includes the punch-down terminals 950 to facilitate rapid and reliable installation of unshielded twisted pair cables. In this embodiment, terminals are provided for three audio cables so that one can provide an input and two others can branch the digital audio datastream out to other nodes. Because the node includes a self-routing hub, connections to the terminals may be made in any order. The screw terminals 960 connect the loudspeaker to the in-wall mains wiring to provide power to operate the loudspeaker circuit. Multiple terminals enable daisy chaining of the mains power and ground to other locations inside the walls in the same manner as the terminals on standard AC outlets and switches. In another embodiment, wire slot terminals are used to connect the node 900 to mains power.

The inscription on the back panel 940 indicates that the node reproduces only a mono audio signal. It could do this, for example, by mixing the left and right audio channels of an audio stream. The mono operation is a permanent configuration for this loudspeaker node. However, the digital audio datastream it passes to the next node contains all of the original audio information, unmodified. In one embodiment, it inserts its volume setting in the user metadata for the next node. Other options may be implemented for the volume level setting at various nodes to suit specific applications within the scope of the appended claims.

Figure 10:
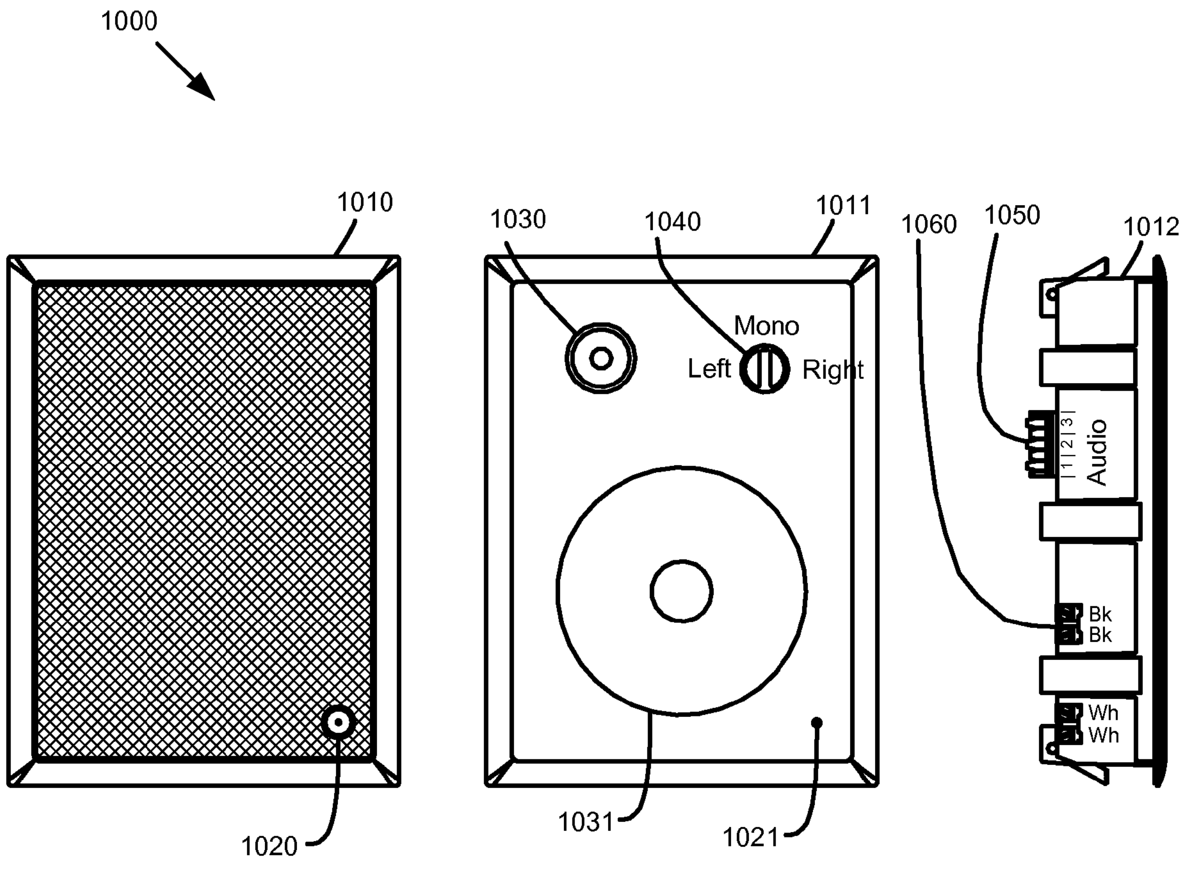
FIG. 10 illustrates a loudspeaker node that may be used with both stereo and mono audio signals.

FIG. 10 illustrates a loudspeaker node 1000 that may be used to reproduce both stereo and mono audio channels. Shown in FIG. 10 are a loudspeaker 1010, a speaker face 1011, a volume control knob 1020, a volume control shaft 1021, a tweeter 1030, a woofer 1031, a mode switch 1040, punch-down terminals 1050, and screw terminals 1060.

In FIG. 10, the volume level of the loudspeaker 1010 is set by the volume control knob 1020. The speaker face 1011, which shows the loudspeaker 1010 with the grill removed, includes the volume control shaft 1021, the tweeter 1030, and a woofer 1031. In another embodiment, one speaker of a stereo pair has no volume control, and the volume control in the other speaker sets the volume for both speakers. In a further embodiment, an infrared sensor is used to set the volume level with a remote control. A speaker with a volume control may be the control node of a control branch.

The loudspeaker node 1000 may include other controls and settings. For example, loudspeakers commonly have controls that adjust their tonal qualities, such as bass and treble boost. The mode switch 1040 configures the loudspeaker node 1000 to operate as a left speaker, a right speaker, or a mono speaker. In the mono speaker mode, the loudspeaker node 1000 reproduces a mix of the left and right channels. In one embodiment, the loudspeaker node 1000 is configured to decode a theater sound format such as DTS, and the mono configuration reproduces a mixture of the several theatre sound channels. In another embodiment, the left and right speaker configurations each reproduce a different mixture of the theater sound channels. In other embodiments, other controls are included, such as a volume trim control hidden beneath the loudspeaker grille. The punch-down terminals 1050 and the screw terminals 1060 facilitate daisy chaining of digital audio and mains wiring as described for the terminals 950 and 960 in FIG. 9.

Figure 11:
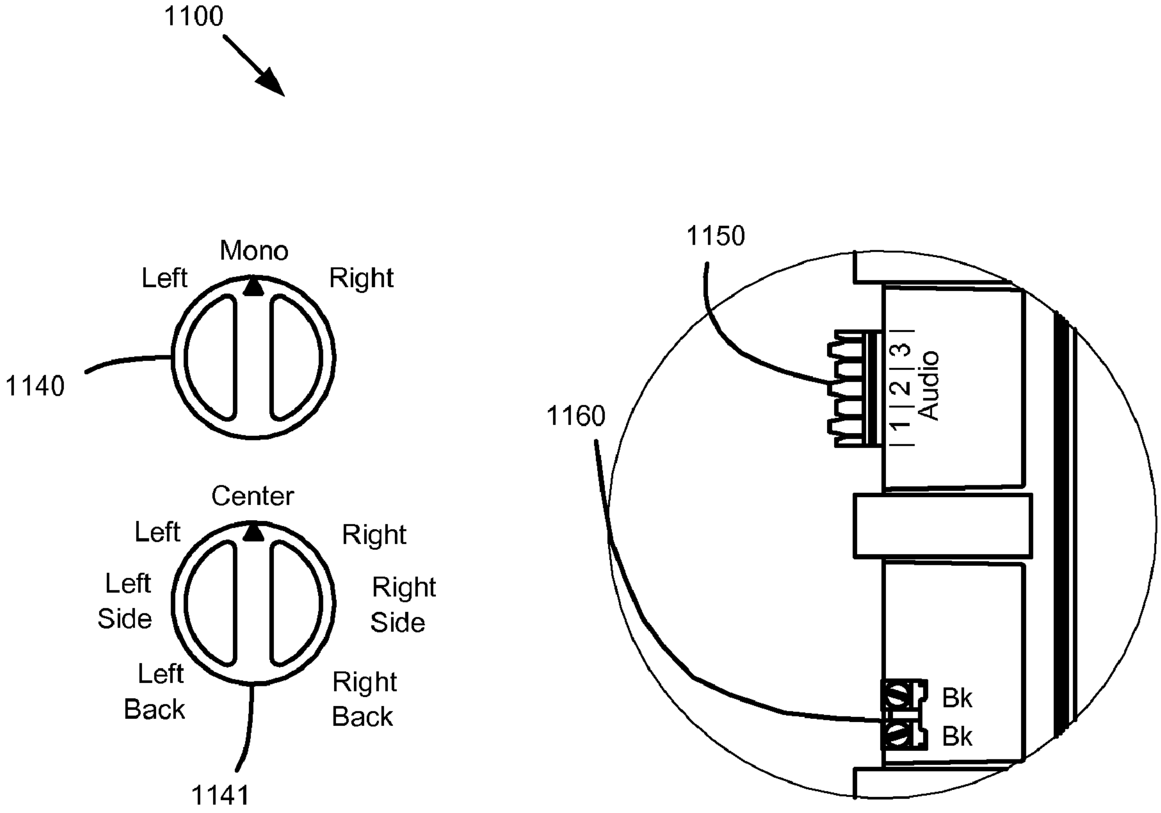
FIG. 11 shows a detail of controls and connections on the loudspeaker node of FIG. 10.

FIG. 11 illustrates shows a detailed diagram of two channel controls for the loudspeaker node of FIG. 10. Shown in FIG. 11 are a mono/stereo channel selector 1140, a theatre channel selector 1141, punch-down terminals 1150, and screw terminals 1160.

In FIG. 11, the mono/stereo channel selector 1140 selects the mono channel, the left stereo channel, or the right stereo channel. The theatre channel sector 1141 selects one of the theatre channels. A pair of loudspeaker nodes 1000 can reproduce the left and right channels of a stereo audio stream, and seven loudspeaker nodes 1000 can reproduce seven surround-sound channels.

The punch-down terminals 1150 and the screw terminals 1160 facilitate daisy chaining of audio and mains wiring as described for the terminals 950 and 960 in FIG. 9. The audio terminals are not marked “in” or “out”, because this example node includes a self-routing hub. In other embodiments, hubs that do not automatically route audio signals have audio connections that are separately marked for the input audio channel and the output audio channels.

Figure 12:
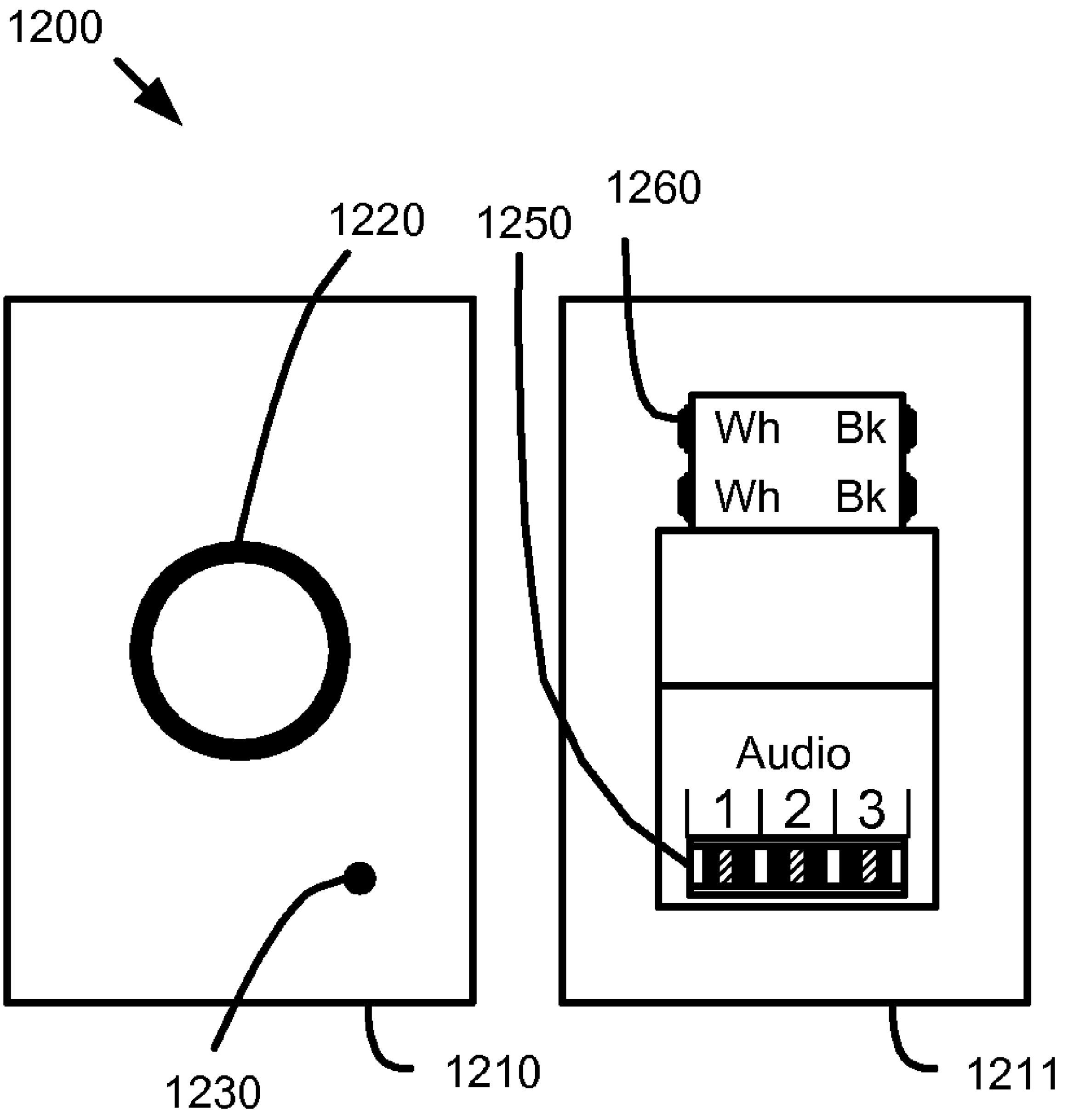
FIG. 12 illustrates a volume control as the control node for a control branch.

FIG. 12 illustrates a volume control 1200 as the control node for a control branch. Shown in FIG. 12 are a faceplate 1210, a back panel 1211, a volume control knob 1220, an LED 1230, punch-down terminals 1250, and screw terminals 1260.

In FIG. 12, the volume control 1200 is designed to mount inside a standard 2"×4" electrical junction box that may be placed in a wall. In one embodiment, the volume control knob 1220 controls the volume level of the downstream nodes. In other embodiments, the control is a slider, pushbutton, an infrared remote receiver, or other control device. In one embodiment, the LED 1230 on the faceplate 1210 provides visual feedback on the status of the volume control 1200, such as when the device is on or when the volume level is set to maximum. The punch-down terminals 1250 and the screw terminals 1260 facilitate daisy chaining of audio and mains wiring as described for the terminals 950 and 960 in FIG. 9.

Figure 13:
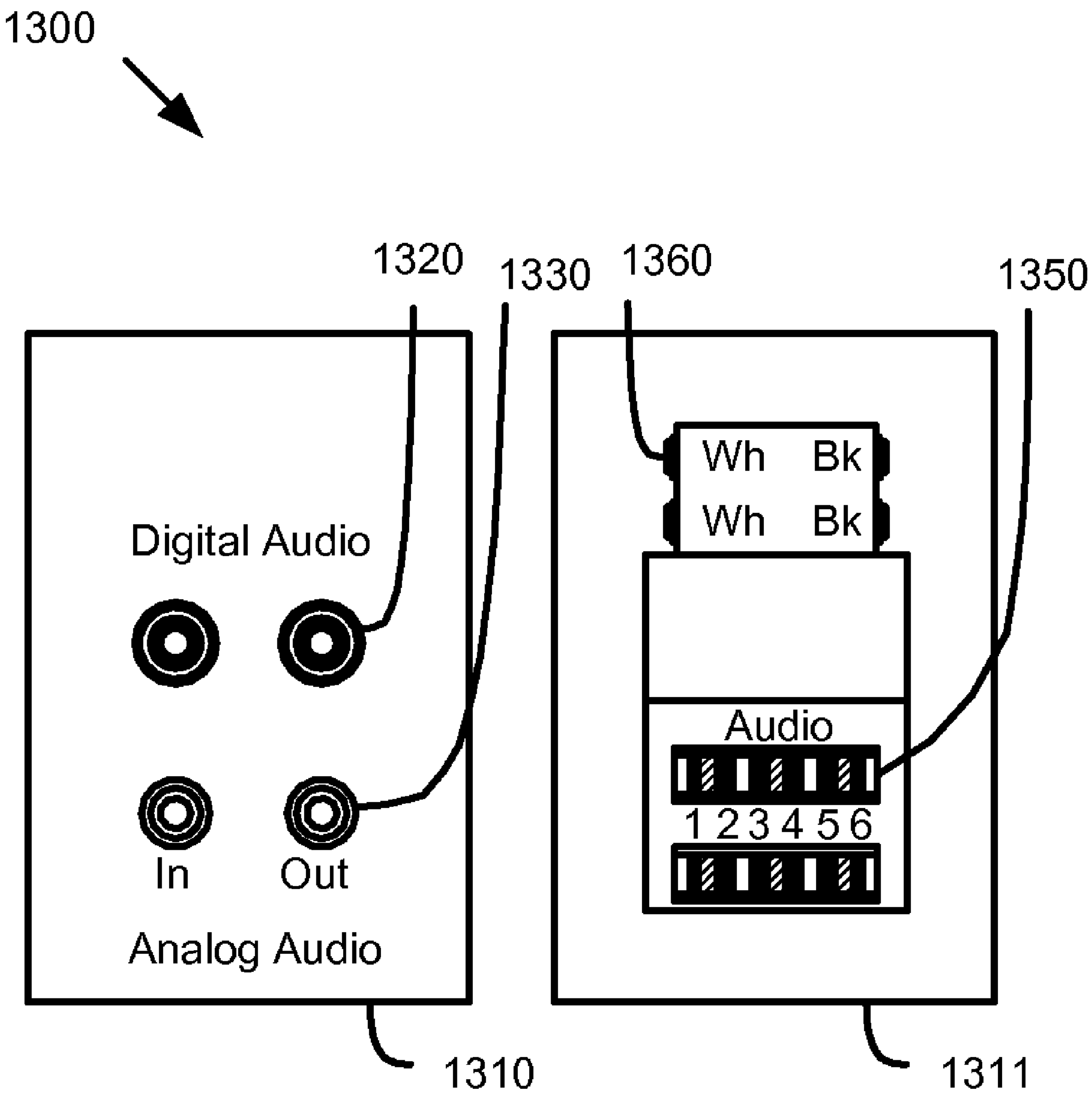
FIG. 13 illustrates a termination node that incorporates a self-routing hub and multiple means to connect the network to standard audio equipment.

FIG. 13 illustrates a termination node 1300 that incorporates a self-routing hub and multiple means to connect the network to standard audio equipment. Shown in FIG. 13 are a faceplate 1310, a back panel 1311, digital audio connectors 1320, analog audio connectors 1330, punch-down terminals 1350, and screw terminals 1360.

In FIG. 13, the digital audio connectors 1320 for connecting to external devices may be, for example, standard RCA coaxial connectors used in consumer audio equipment. The format of the digital audio datastream is designed to be compatible with standard audio equipment using, for example, the IEC60598 Type I (SPDIF) standard. In another embodiment, a professional version uses the IEC60598 Type II (AES/UBE) standard XLR connectors instead of the RCA connectors. In a further embodiment, the digital audio connections are self-routing so that the digital audio connectors 1320 may be used for both input and output.

Analog audio connectors 1330 receive analog audio into the network (which converts it to a digital audio datastream), or transmit it out of the network (after converting it from the network's digital audio datastream).

The punch-down terminals 1350 and the screw terminals 1360 facilitate daisy chaining of audio and mains wiring as described for the terminals 950 and 960 in FIG. 9.

In another embodiment, the termination node 1300 includes a pushbutton or other form of user input to initiate an attention-getting process that reroutes the network to listen to this particular node.

Figure 14:
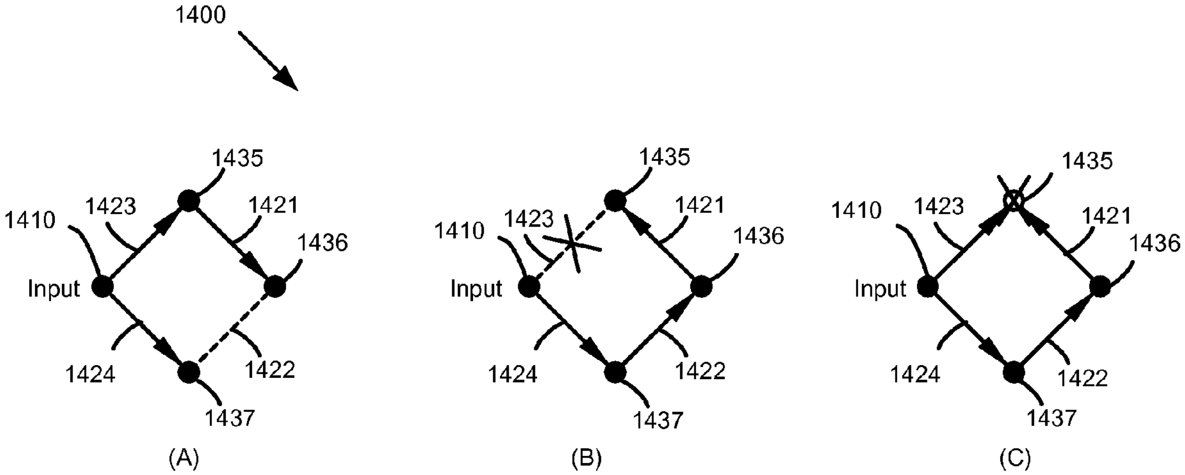
FIGS. 14A, 14B, and 14C illustrate a self-healing network.

FIGS. 14A, 14B, and 14C illustrate a self-healing network 1400. Shown in FIGS. 14A, 14B, and 14C are nodes 1410, 1435, 1436, and 1437, and cables 1421, 1422, 1423, and 1424.

In FIG. 14A, the input node 1410 can receive a digital audio datastream and pass the digital audio datastream to the three nodes 1435, 1436, and 1437 using only the three cables 1421, 1423, and 1424.

In FIG. 14B, the addition of the fourth cable 1422 makes the network self-healing. In normal operation, one of the cables, for example, cable 1422, will not be used by the network. In practice, the digital audio datastream enters at both ends of the cable 1422 producing a data collision, but the data collision is inconsequential. If cable 1423 breaks or fails in some way, the nodes 1435 and 1436 cease to receive the digital audio datastream and initiate a search cycle. When the node 1436 detects the digital audio datastream coming from node 1437, it sends it on to the node 1435, and all the nodes receive the digital audio datastream again. The arrows on the cables show that the direction of propagation on some cables is the reverse of what is was originally.

In FIG. 14C, a similar process restores the network 1400 if the node 1435 fails. In this manner the loss of a single node does not cause the other nodes to fail.

An attention-sensitive node differs from other nodes in that an attention-sensitive node can receive information from a downstream node. The downstream node accomplishes this with an attention signal that instructs the attention-sensitive node to stop what it is doing and to pay attention to i.e., receive information from, this downstream node. Attention signals may take the form of a digital audio datastream, and they can also take other forms.

FIGS. 15A, 15B, 15C and 15D illustrate the network of FIG. 14A with attention-sensitive nodes. Shown in FIGS. 15A, 15B, 15C and 15D are nodes 1510, 1511, 1512, and 1513, and cables 1520, 1521, 1522, and 1523.

Figure 15:
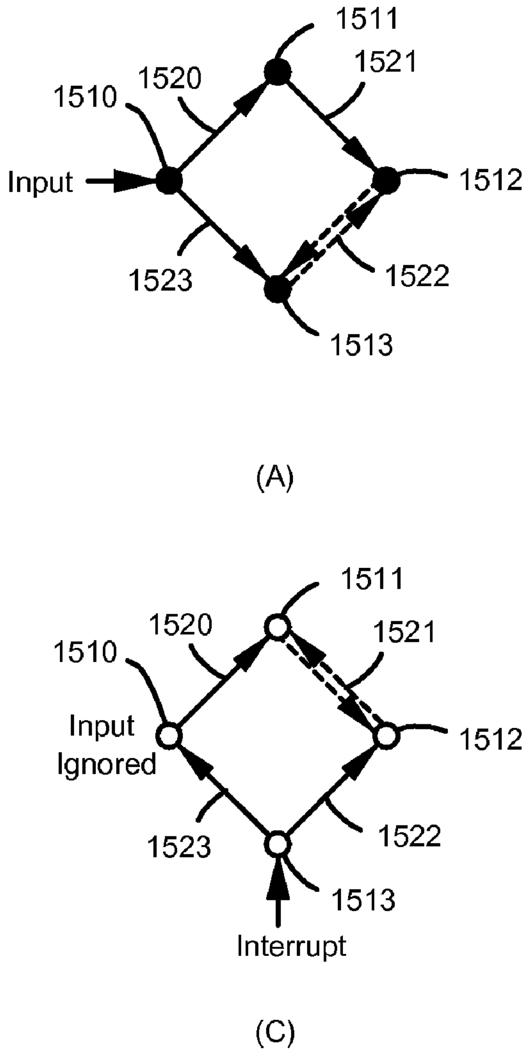
FIGS. 15A, 15B, 15C, and 15D illustrate the network of FIG. 14A with an attention-sensitive node.

This example assumes an IEC60598 (SPDIF) data format. In various embodiments, other data formats may be used to suit specific applications within the scope of the appended claims. Under normal circumstances, data collisions do not degrade the operation of typical nodes. In FIG. 15A, cable 1522 experiences a data collision because nodes 1512 and 1513 are transmitting a digital audio datastream into both ends of cable 1522, but the data collision does not degrade the operation of the network.

A data collision can be the means to get the attention of an attention-sensitive node. In FIG. 15B, node 1513 initiates an interruption with an attention-getting SPDIF digital audio datastream. This datastream includes an attention-getting value in the attention bits of the user metadata. The interrupt process begins when node 1513 switches to an attention mode, symbolized by the open circle node symbol. Node 1513 ceases to receive on cable 1523 and transmits the attention-getting datastream on cables 1522 and 1523. As a result, there are data collisions on cables 1523 and 1522.

In FIG. 15C, attention-sensitive nodes 1510, and 1512 have detected the data collision, read the attention bits and have also switched into attention mode; node 1511 follows and does the same. As a result, the previous input into node 1510 is now ignored and nodes 1510, 1511, and 1512 are all receiving the attention signal. There is a data collision on cable 1521, (it could occur instead, for example, on cable 1520); however, the data collision does not affect this process.

In FIG. 15D, the attention-getting datastream has been replaced with a digital audio datastream now originating from node 1513 and carrying normal audio, and the digital audio distribution network is rerouted.

In the example described above, the interrupt process would likely be initiated with a user input such as a push button, which signals the audio processor to place the attention bits in the digital audio datastream transmitted from the node or to create and transmit a new digital audio datastream containing the attention bits. Some device such as a timer or a sensor may generate inputs automatically. In this manner, the network can reroute audio that enters the network at the node as an analog signal at the audio signal input 751 of the audio processor 700 or as a digital audio datastream.

There are other reasons for using attention-sensitive nodes. Because node inputs are bidirectional, nodes can use metadata to communicate with one another. In various embodiments, bidirectional commands between pairs of nodes provide a convenient means to quickly map the topology of the network. One purpose for mapping the network is to enable station identifiers to be assigned to each station, for example to identify paging stations. In other embodiments, bidirectional commands between pairs of nodes may be used to identify faulty or non-functioning nodes and cables that require service. In further embodiments, bidirectional commands between pairs of nodes may be used to instruct a node to perform a function or as a means to gather information. In another embodiment, the functions to be performed may include adjusting node settings, for example, loudspeaker volume trim controls or equalization.

High power audio loudspeakers require more power than common twisted pair wiring can supply, but there are circumstances where supplying small amounts of power over the twisted pair wiring may be useful. For example, a termination node uses a low power level that a twisted pair can easily supply. In some instances, it may be more convenient to obtain this power over the twisted pair wiring than from the mains wiring.

Digital audio datastreams commonly occupy a known bandwidth. For example, digital audio using the IEC60598 Type 1 standard occupies a bandwidth of 100 kHz to 6 MHz. Accordingly, the same twisted pair can supply power as a DC voltage or a 60 Hz AC voltage that lies outside this bandwidth. In one embodiment, the network is designed to allow the power and digital audio to reside on the same twisted pair of wires. In other embodiments, some nodes supply power to other nodes over the same twisted pair.

In a further embodiment, power is supplied to the nodes over unused twisted pairs. For example, if the network cables are run using CAT5 or CAT6 cables, the digital audio distribution network only requires one of the four available twisted pairs. In one embodiment, another of the twisted pairs carries power from one node to another.

Although the flowchart descriptions above are described and shown with reference to specific steps performed in a specific order, these steps may be combined, sub-divided, or reordered without departing from the scope of the claims. Unless specifically indicated, the order and grouping of steps is not a limitation of other embodiments that may lie within the scope of the claims.

The specific embodiments and applications thereof described above are for illustrative purposes only and do not preclude modifications and variations that may be made within the scope of the following claims.

What is claimed is:

1. A digital audio distribution network comprising:

a plurality of nodes for sending and receiving digital audio and for sending and receiving attention signals, each node comprising a plurality of junctions and a processor;

at least one transmission line, each line connecting a junction of one node to a junction of another node and transmitting the audio in one direction from the one node to the another node, to form the network;

a node in the plurality of nodes for receiving a user command from a user input, the command indicating a function to be performed, encoding the command, combining the command into digital audio, and sending the audio; and another node in the plurality of nodes for receiving the audio, decoding the command, and performing the command's function;

wherein each processor is programmed to perform the encoding, the combining, and the decoding; and wherein each processor is further programmed to implement the function of reversing the audio direction between two connected nodes, one node of the two nodes a first receiving node and the other a second sending node, by the following process:

the first node's processor causes it to cease receiving audio from the second node, then to send an attention signal to the second node, then to transmit audio to the second node, and when the second node receives the attention signal, its processor causes it to cease sending audio to the first node and then to receive audio from the first node.

2. The network of claim 1, wherein the processor is programmed to implement functions in response to user commands, wherein the function is different from reversing the audio direction.

3. The network of claim 1 further comprising metadata that incorporates the encoded user command.

4. The network of claim 1, the transmission line comprising only a single unshielded twisted pair.

5. The network of claim 2, the function comprising setting a volume level of a loudspeaker.

6. The network of claim 2, the audio comprising a plurality of streams, and the function comprising selecting one stream.

7. The network of claim 2, the function comprising switching a loudspeaker between a first audio stream and a second audio stream.

8. The network of claim 7, one of the first and second audio streams comprising a paging stream.

9. The network of claim 2, the function comprising a condition that determines when the function is to be performed.

10. The network of claim 2, the function comprising sending information requested by the user command over the transmission line.

11. The network of claim 2, the function comprising changing settings of a node.

12. The digital audio distribution network of claim 1 wherein each node's processor is programmed to reverse the audio direction between two connected nodes in response to a user command from a user input.

13. The network of claim 1, the attention signal comprising a data collision.

14. The network of claim 1, comprising three nodes and two lines;

wherein one line connects a junction on node one of the three nodes to a junction on node two, and the other line connects another junction on node two to a junction on node three;

wherein audio flows from node one to and through node two, then to node three; and wherein the processors are further programmed to implement the function of reversing the audio flow by the following process:

the third node's processor causes it to cease receiving audio, then to send an attention signal to node two, then to transmit audio to node two;

when node two receives the attention signal, its processor causes it to cease sending audio to node three and to cease receiving audio from node one, then to send an attention signal to node 1, then to begin receiving audio from node three and to begin sending audio to node one;

when node one receives the attention signal, its processor causes it to cease sending audio to node two and then to receive audio from node two.

15. A digital audio distribution network comprising:

a plurality of connected nodes, each node comprising:

a plurality of junctions, the junctions for making the connections, each junction for making a single connection; and a processor;

at least one transmission line that connects the plurality of nodes, each connection at a junction, to form the network;

wherein each line transmits digital audio in a one directional flow from one node in the plurality of nodes to one other node; and wherein each processor is programmed:

to control the sending, or alternately the receiving, of digital audio through each of the node's junctions, the controlling at each junction of a node being independent of the other junctions of the node;

to receive a command from a user input indicating a function to be performed, and to encode and merge the command into sent audio;

to decode a command from received audio;

to send an attention signal through a receiving junction;

to receive an attention signal through a sending junction; and to implement the function of reversing the direction of audio flow in a pair of connected nodes, a first sending node and a second receiving node, by a process comprising the following steps:

the second node ceases to receive the audio, then sends an attention signal to the first node, and then sends audio to the first node;

when the first node receives the attention signal, it ceases to send audio to the second node, and then receives audio from the second node.

16. The network of claim 15 comprising a first, a second, and a third node, and a first line connecting nodes one and two, and a second line connecting nodes two and three;

wherein:

node one encodes and merges a user command into digital audio;

the audio flows from the node one, to and through node two, and to node three; and, node three receives the audio and decodes the command; and wherein the processors are programmed to perform the function of reversing the flow direction by a process comprising the following steps:

node three ceases to receive audio, then sends an attention signal to node two, and then transmits audio to node two;

when node two receives the attention signal, it ceases to send audio to node three and to receive audio from node one, then sends an attention signal to node one, then receives audio from node three and sends audio to node one;

when node one receives the attention signal from node two, it ceases to transmit audio to node two, and then receives audio from node two.

17. The network of claim 15, wherein the processor is programmed to implement functions in response to user commands, wherein the function is different from reversing the audio direction.

18. The network of claim 15 further comprising metadata that incorporates the encoded user command.

19. The network of claim 15, the transmission line comprising only a single unshielded twisted pair.

20. The network of claim 17, the function comprising setting a volume level of a loudspeaker.

21. The network of claim 17, the function comprising selecting an audio stream.

22. The network of claim 17, the function comprising switching a loudspeaker between a first audio stream and a second audio stream.

23. The network of claim 22, one of the first and second audio streams comprising a paging stream.

24. The network of claim 17, the function comprising a condition that determines when the function is to be performed.

25. The network of claim 17, the function comprising sending information requested by the user command over the transmission line.

26. The network of claim 17, the function comprising changing settings of a node.

27. The digital audio distribution network of claim 15 wherein each node's processor is programmed to reverse the audio direction between two connected nodes in response to a user command from a user input.

28. The network of claim 15 , the attention signal comprising a data collision.

* * * * *